US012137385B1

(12) United States Patent
Kim

(10) Patent No.: US 12,137,385 B1
(45) Date of Patent: Nov. 5, 2024

(54) METHOD AND APPARATUS FOR PERFORMING CELL LEVEL MOBILITY IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

( * ) Notice: Subject to any disclaimer, the term of this patent is extended or adjusted under 35 U.S.C. 154(b) by 0 days.

(21) Appl. No.: 18/672,103

(22) Filed: May 23, 2024

(30) Foreign Application Priority Data

Jun. 15, 2023 (KR) .................. 10-2023-0076730

(51) Int. Cl.
*H04W 36/08* (2009.01)
*H04W 36/00* (2009.01)
*H04W 36/24* (2009.01)

(52) U.S. Cl.
CPC ....... *H04W 36/08* (2013.01); *H04W 36/0072* (2013.01); *H04W 36/249* (2023.05)

(58) Field of Classification Search
CPC .............................. H04W 80/02; H04L 69/28
USPC ........................................... 370/331; 455/437
See application file for complete search history.

(56) References Cited

U.S. PATENT DOCUMENTS

2019/0313309 A1* 10/2019 Tsuboi ............... H04W 36/0064
2023/0040867 A1* 2/2023 Hori ..................... H04W 48/20

OTHER PUBLICATIONS

3GPP, 3rd Generation Partnership Project; Technical Specification Group Radio Access Network; NR; Medium Access Control (MAC) protocol specification (Release 17), Mar. 2023, pp. 1-252, 3GPP TS 38.321 V17.4.0, http://www.3gpp.org.
3GPP, 3rd Generation Partnership Project; Technical Specification Group Radio Access Network; NR; Physical layer procedures for control (Release 17), Mar. 2023, pp. 1-261, 3GPP TS 38.213 V17.5.0, http://www.3gpp.org.
3GPP, 3rd Generation Partnership Project; Technical Specification Group Radio Access Network; NR; Radio Resource Control (RRC) protocol specification (Release 17), Mar. 2023, pp. 1-1324, 3GPP TS 38.331 V17.4.0, http://www.3gpp.org.
3GPP, 3rd Generation Partnership Project; Technical Specification Group Radio Access Network; NR; NR and NG-RAN Overall Description; Stage 2 (Release 17), Mar. 2023, pp. 1-210, 3GPP TS 38.300 V17.4.0, http://www.3gpp.org.

* cited by examiner

*Primary Examiner* — Kiet M Doan
(74) *Attorney, Agent, or Firm* — Kevin P. Radigan, Esq.; Heslin Rothenberg Farley & Mesiti P.C.

(57) ABSTRACT

A method and apparatus to support cell level mobility is provided. Method for supporting cell level mobility includes receiving a Radio Resource Control (RRC) reconfiguration message, performing a set of operations and performing data transfer in the second cell after performing a specific operation of the set of operations. In case that the RRC reconfiguration message comprises a specific set of parameters, the set of operations comprises starting a timer related to cell level mobility, resetting Medium Access Control (MAC) entity, adjusting uplink transmission timing based on a parameter related to target timing advance, receiving a layer 1 grant based on a first identifier, performing uplink transmission of a specific MAC Protocol Data Unit (PDU) based on the layer 1 grant, receiving downlink assignment and stopping the timer related to cell level mobility.

13 Claims, 9 Drawing Sheets

METHOD AND APPARATUS FOR PERFORMING CELL LEVEL MOBILITY IN MOBILE WIRELESS COMMUNICATION SYSTEM

CROSS-REFERENCE TO RELATED APPLICATION

This application claims priority to and the benefit of Korean Patent Application No. 10-2023-0076730, filed on Jun. 15, 2023, the disclosure of which is incorporated herein by reference in its entirety.

BACKGROUND

Technical Field

The present disclosure relates to cell level mobility in a mobile communication system. More specifically, the present disclosure relates to performing cell level mobility to a target cell based on layer 1 grant received in the target cell.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

In the 5G communication system, various services like network energy saving and non-terrestrial network are introduced. These new services impose difficulties in mobility in that network node covering a certain geographical area may change during a short period of time. To tackle the problems, enhancements on conditional reconfiguration could be considered.

SUMMARY

Aspects of the present disclosure are to address the problems of cell level mobility. The method includes receiving a Radio Resource Control (RRC) reconfiguration message, performing a set of operations and performing data transfer in the second cell after performing a specific operation of the set of operations. In case that the RRC reconfiguration message comprises a specific set of parameters, the set of operations comprises starting a timer related to cell level mobility, resetting Medium Access Control (MAC) entity, adjusting uplink transmission timing based on a parameter related to target timing advance, receiving a layer 1 grant based on a first identifier, performing uplink transmission of a specific MAC Protocol Data Unit (PDU) based on the layer 1 grant, receiving downlink assignment and stopping the timer related to cell level mobility.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Figure 1A:
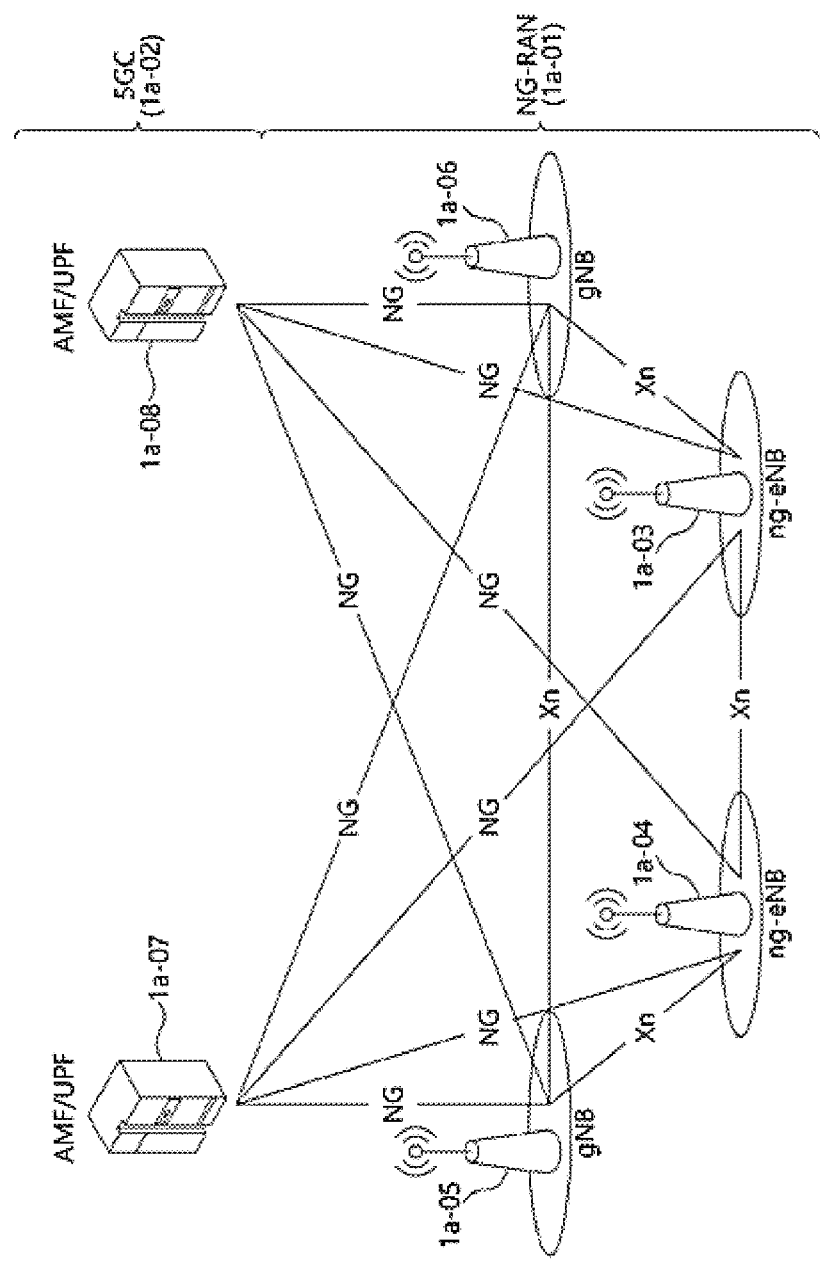
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
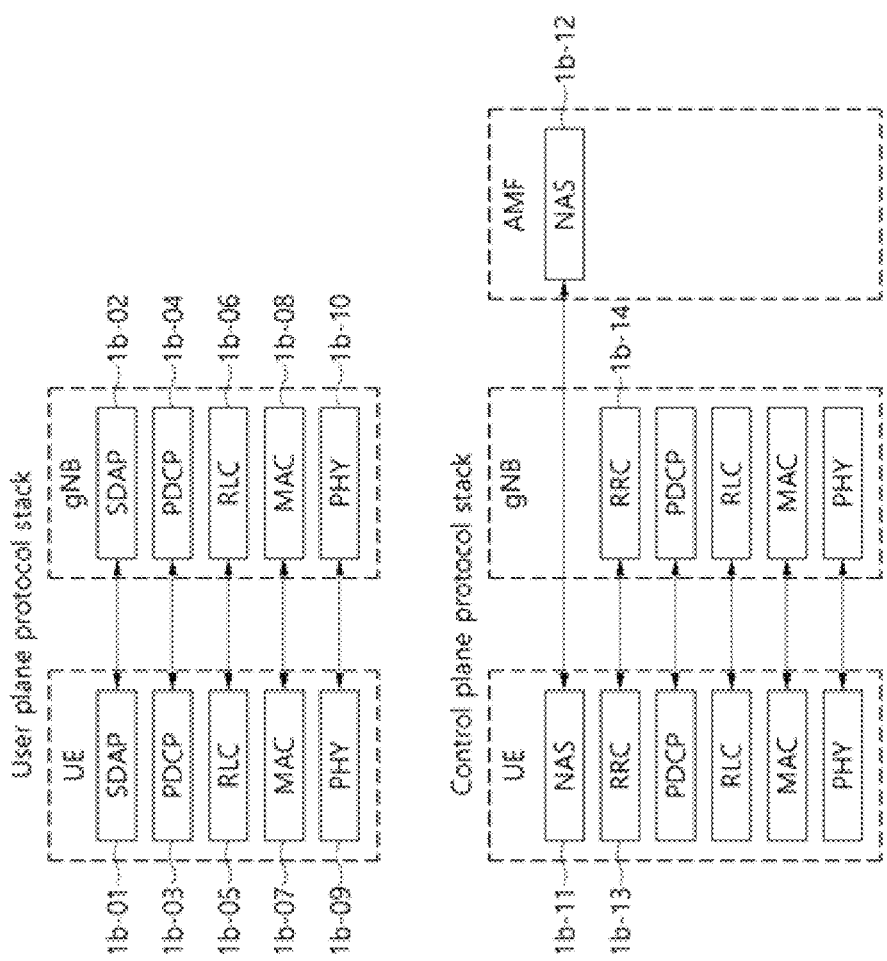
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

An IE in a field may contain one or more chield fields and child IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/upstream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

Figure 1C:
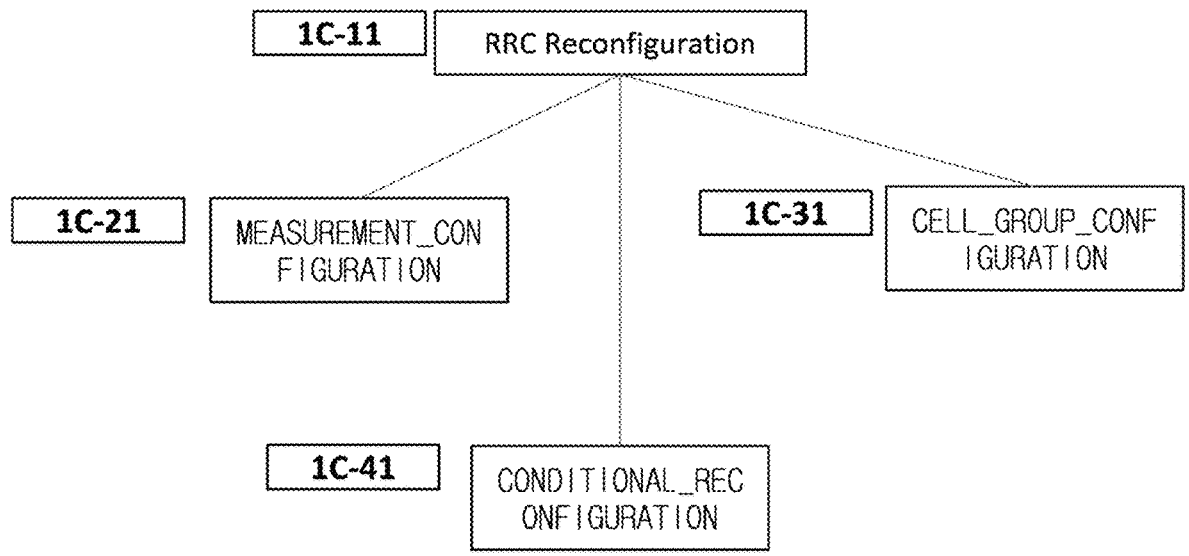
FIG. 1C is a diagram illustrating structure of a RRC reconfiguration message.

FIG. 1C illustrates a RRC Reconfiguration message.

RRC Reconfiguration Message

A RRC Reconfiguration Message 1C-1I comprises various fields and IEs for a UE.

A RRC Reconfiguration Message may comprise a measurement_confiugration and a master_cell_group and a conditional_reconfiguration.

The measurement_confiugration includes a MEASUREMENT_CONFIUGRATION 1C-21.

The master_cell_group includes CELL_GROUP_CONFIGURATION 1C-31.

The conditional_reconfiguration includes CONDITIONAL_RECONFIGURATION 1C-41.

MEASUREMENT_CONFIGURATION

The MEASUREMENT_CONFIGURATION specifies measurements to be performed by the UE, and covers intra-frequency, inter-frequency and inter-RAT mobility as well as configuration of measurement gaps.

The MEASUREMENT_CONFIGURATION comprises following fields and IEs.

MEASUREMENT_CONFIGURATION::=SEQUENCE
 {
 measurement_objectLbox_list MEASUREMENT_OBJECT_BOX_LIST OPTIONAL,
 report_configuration_box_list REPORT_CONFIGURATION_BOX_LIST OPTIONAL,
 measurement_identifier_box_list MEASUREMENT_IDENTIFIER_BOX_LIST OPTIONAL,
 skip_measurement_configuration CHOICE {
  ssb_rsrp RSRP-Range,
  csi_rsrp RSRP-Range
 } OPTIONAL,
 measurement_quantity_configuration_container MEASUREMENT_QUANTITY_CONFIGURATION_CONTAINER OPTIONAL,
 measurement_gap_configuration MEASUREMENT_GAP_CONFIGURATION OPTIONAL,
 . . .
 } measurement_identifier_box_list: List of MEASUREMENT IDENTIFIER BOXs.

measurement_object_box_list: List of MEASUREMENT_OBJECT_BOXs.

report_configuration_box_list: List of REPORT_CONFIGURATION_BOXs.

skip_measurement_configuration: Threshold for NR SpCell RSRP measurement controlling when the UE is required to perform measurements on non-serving cells. Choice of ssb_rsrp corresponds to cell RSRP based on SS/PBCH block and choice of csi_rsrp corresponds to cell RSRP of CSI-RS.

The MEASUREMENT_IDENTIFIER_BOX_LIST concerns a list of measurement-identifiers to add or modify, with for each entry the MEASUREMENT_IDENTIFIER, the associated MEASUREMENT_OBJECT_IDENTIFIER and the associated REPORT_CONFIGURATION_IDENTIFIER.

MEASUREMENT_IDENTIFIER_BOX_LIST::=SEQUENCE (SIZE (1. integer)) OF MEASUREMENT_IDENTIFIER_BOX
MEASUREMENT_IDENTIFIER_BOX::=SEQUENCE
{
measurement identifier MEASUREMENT IDENTIFIER,
measurement_object_identifier MEASUREMENT_OBJECT_IDENTIFIER,
report_configuration_identifier REPORT_CONFIGURATION_IDENTIFIER
}

A MEASUREMENT_identifier associated with a first type report-configuration is a first type measurement-identifier. . . .

A MEASUREMENT_identifier associated with a second type report-configuration is a second type measurement-identifier. . . .

A first type report-configuration is configured by the REPORT_CONFIGURATION that contains a type1_event_triggered. . . .

A second type report-configuration is configured by the REPORT_CONFIGURATION that contains a type2_event_triggered . . . .

The MEASUREMENT_OBJECT_BOX_LIST concerns a list of measurement-objects to add or modify.

MEASUREMENT_OBJECT_BOX_LIST::=SEQUENCE (SIZE (1. integer)) OF MEASUREMENT_OBJECT_BOX
MEASUREMENT_OBJECT_BOX::=SEQUENCE {
measurement_object_identifier MEASUREMENT_OBJECT_IDENTIFIER,
measurement_object_nr MEASUREMENT_OBJECT_NR,
}

The MEASUREMENT_OBJECT_NR specifies information applicable for SS/PBCH block(s) intra/inter-frequency measurements and/or CSI-RS intra/inter-frequency measurements.

MEASUREMENT_OBJECT_NR::=SEQUENCE {
ssb_frequency ARFCN-ValueNR OPTIONAL,
reference_signal_configuration REFERENCE_SIGNAL_ CONFIGURATION,
absolute_threshold_ssb_consolidation THRESHOLD_NR OPTIONAL,
number_of_ssb_to_average INTEGER (2..integer) OPTIONAL,
measurement_quantity_configuration_index INTEGER (1.. integer),
measurement_quantity_configuration_index_2 INTEGER (1.. integer),
} absolute_threshold_ssb_consolidation: Absolute threshold for the consolidation of measurement results per SS/PBCH block(s) from L1 filter(s). The field is used for the derivation of cell measurement results and the reporting of beam measurement information per SS/PBCH block index.

number_of_ssb_to_average: Indicates the maximum number of measurement results per beam based on SS/PBCH blocks to be averaged. The same value applies for each detected cell associated with this measurement-object.

measurement_quantity_configuration_index: Indicates the n-th element of measurement_qauntity_configuration_nr_list provided in MEASUREMENT_CONFIGURATION for type1 measurement on first applicable cells.

measurement_quantity_configuration_index_2: Indicates the n-th element of measurement_qauntity_configuration_nr_list provided in MEASUREMENT_CONFIGURATION for type2 measurment on a second appicable cell.

ssb_frequency: Indicates the frequency of the SS associated to this MEASUREMENT_OBJECT_NR.

The REPORT_CONFIGURATION_BOX_LIST concerns a list of reporting configurations to add or modify.
REPORT_CONFIGURATION_BOX_LIST::=SEQUENCE (SIZE (1.. integer)) OF REPORT_CONFIGURATION_BOX
REPORT_CONFIGURATION_BOX::=SEQUENCE {
report_configuration_identifier REPORT_CONFIGURATION_IDENTIFIER,
report_configuration REPORT_CONFIGURATION,
}

The REPORT_CONFIGURATION specifies criteria for triggering of an NR measurement reporting event or of a CHO, CPA or CPC event For events labelled AN with N equal to 1, 2 and so on, measurement reporting events and CHO, CPA or CPC events are based on cell measurement results, which can either be derived based on SS/PBCH block or CSI-RS.

REPORT_CONFIGURATION::=SEQUENCE {
report_type CHOICE {
type1_event_triggered
TYPE1_EVENT_CONFIGURATION,
type2_event_triggered
TYPE2_EVENT_CONFIGURATION,
}
}
TYPE2_EVENT_CONFIGURATION::=SEQUENCE {
type2_event_type CHOICE {
type2_event_a3 SEQUENCE {
a3_offset MEASUREMENT_TRIGGER_QUANTITY_OFFSET,
hysteresis Hysteresis,
duration_to_trigger DURATION_TO_TRIGGER
},
type2_event_a4 SEQUENCE {
a4_threshold MEASUREMENT_TRIGGER_QUANTITY,
hysteresis Hysteresis,
duration_to_trigger DURATION_TO_TRIGGER
},
type2_event_t1 SEQUENCE {
t1_threshold INTEGER (0.549755813887),
evaluation_duration INTEGER (1..6000)
}
},

```
reference_signal_type    NR_REFERENCE_SIGNAL_
    TYPE,
...
}
TYPE1_EVENT_CONFIGURATION::=SEQUENCE {
type1_event_type CHOICE {
type1_event_a1 SEQUENCE {
a1-Threshold    MEASUREMENT_TRIGGER_QUAN-
    TITY,
hysteresis Hysteresis,
duration_to_trigger DURATION_TO_TRIGGER
},
type1_event_a2 SEQUENCE {
a2-Threshold    MEASUREMENT_TRIGGER_QUAN-
    TITY,
hysteresis Hysteresis,
duration_to_trigger DURATION_TO_TRIGGER
},
type1_event_a3 SEQUENCE {
a3_offset    MEASUREMENT_TRIGGER_QUANTI-
    TY_OFFSET,
hysteresis Hysteresis,
duration_to_trigger DURATION_TO_TRIGGER,
},
type1_event_a4 SEQUENCE {
a4_threshold    MEASUREMENT_TRIGGER_QUAN-
    TITY,
hysteresis Hysteresis,
duration_to_trigger DURATION_TO_TRIGGER,
},
},
reference_signal_type    NR_REFERENCE_SIGNAL_
    TYPE,
}
NR_REFERENCE_SIGNAL_TYPE::=ENUMERATED
    {ssb, csi-rs}
MEASUREMENT_TRIGGER_QUANTITY::=CHOICE
    {
rsrp RSRP-Range,
rsrq RSRQ-Range,
sinr SINR-Range
}
MEASUREMENT_TRIGGER_QUANTITY_OFF-
    SET::= CHOICE {
rsrp INTEGER (-30.30),
rsrq INTEGER (-30.30),
sinr INTEGER (-30..30)
}
```

REPORT_CONFIGURATION FIELD DESCRIPTIONS report_type: Type of the configured measurement report. The type2_event_triggered is used for CHO, CPA or CPC configuration.

TYPE2_EVENT_CONFIGURATION FIELD DESCRIPTIONS a3_offset: Offset value(s) to be used in NR conditional reconfiguration triggering condition for type2-event-a3. The actual value is field value*0.5 dB.

a4_threshold: Threshold value associated to the selected trigger quantity (e.g. RSRP, RSRQ, SINR) per RS Type (e.g. SS/PBCH block, CSI-RS) to be used in NR conditional reconfiguration triggering condition for type2-event-a4.

a5-Threshold1/a5-Threshold2: Threshold value associated to the selected trigger quantity (e.g. RSRP, RSRQ, SINR) per RS Type (e.g. SS/PBCH block, CSI-RS) to be used in NR conditional reconfiguration triggering condition for cond event a5. In the same condtype1_event_a5, the network configures the same quantity for the MEASUREMENT_TRIGGER_QUANTITY of the a5-Threshold1 and for the MEASUREMENT_TRIGGER_QUANTITY of the a5-Threshold2.

type2_event_type: Choice of NR conditional reconfiguration event triggered criteria.

Evaluation_duration: This field is used for defining the leaving condition for type2_event_t1. Each step represents 100 ms.

t1_threshold: The field counts the number of UTC seconds in 10 ms units since 00:00:00 on Gregorian calendar date 1 January, 1900 (midnight between Sunday, Dec. 31, 1899 and Monday, Jan. 1, 1900).

DURATION_TO_TRIGGER: Time during which specific criteria for the event needs to be met in order to execute the conditional reconfiguration execution.

TYPE1_EVENT_CONFIGURATION FIELD DESCRIPTIONS a3_offset: Offset value(s) to be used in NR measurement report triggering condition for type1_event_a3/a6. The actual value is field value*0.5 dB.

aN-ThresholdM: Threshold value associated to the selected trigger quantity (e.g. RSRP, RSRQ, SINR) per RS Type (e.g. SS/PBCH block, CSI-RS) to be used in NR measurement report triggering condition for event number aN.

type1_event_type: Choice of NR event triggered reporting criteria.

The MEASUREMENT_QUANTITY_CONFIGURATION_CONTAINER specifies the measurement quantities and layer 3 filtering coefficients for NR and inter-RAT measurements.

```
MEASUREMENT    QUANTITY_CONFIGURATION_
CONTAINER::=SEQUENCE {
    measurement_qauntity_configuration_nr_list
        SEQUENCE (SIZE (1.. integer)) OF MEASURE-
        MENT_QAUNTITY_CONFIGURATION_NR
        OPTIONAL,
}
```

A MEASUREMENT_QAUNTITY_CONFIGURATION_NR comprises at least one FILTER_COEFFICIENT. A FILTER_COEFFICIENT specifies the measurement filtering coefficient. Value fc0 corresponds to k=0, fc1 corresponds to k=1, and so on.

MEASUREMENT_GAP_CONFIGURATION specifies the measurement gap configuration and controls setup/release of measurement gaps.

MEASUREMENT_GAP_CONFIGURATION comprises following fields.

mg1 field indicates the measurement gap length in ms of the measurement gap.

mgrp field indicates the measurement gap repetition period in (ms) of the measurement gap.

gapOffset field indicates the gap offset of the gap pattern with MGRP indicated in the field mgrp.

CELL_GROUP_CONFIGURATION

The CELL_GROUP_CONFIGURATION is used to configure a master cell group (MCG) or secondary cell group (SCG). A cell group comprises of one MAC entity, a set of logical channels with associated RLC entities and of a primary cell (SpCell) and one or more secondary cells (SCells).

```
CELL_GROUP_CONFIGURATION::=SEQUENCE {
    physical_cell_group_configuration
PHYSICAL_CELL_GROUP_CONFIGURATION
OPTIONAL,
``` special_cell_configuration SPECIAL_CELL_CONFIGURATION OPTIONAL,
scell_box_list SEQUENCE (SIZE (1.. integer)) OF SCELL_BOX OPTIONAL,
}
SPECIAL_CELL_CONFIGURATION includes a TERMINAL_SPECIFIC_CELL_CONFIGURATION of the target cell and a TARGET_CELL_CONFIGURATION.

TARGET_CELL_CONFIGURATION includes a CELL_SPECIFIC_CELL_CONFIGURATION and local_scheduling_identifier and a UPLINK_TRANSMISSION_AT_RECONFIGURATION and cell_level_mobility_supervision_timer. local_scheduling_identifier indicates a local-terminal-identifer to be used for PDSCH scheduling and PUSCH scheduling in the target special cell.

SCELL_BOX includes a TERMINAL_SPECIFIC_CELL_CONFIGURATION of the SCell and CELL_SPECIFIC_CELL_CONFIGURATION of the SCell and the index for the SCell (to identify the SCell).

PHYSICAL_CELL_GROUP_CONFIGURATION comprises cell group specific L1 parameters. PHYSICAL_CELL_GROUP_CONFIGURATION comprises a local_non_scheduling_identifier_layer1 and a local_non_scheduling_identifier_layer3 and a local_scheduling_identifier_layer3.

TERMINAL_SPECIFIC_CELL_CONFIGURATION configures the UE with a serving cell.
TERMINAL_SPECIFIC_CELL_CONFIGURATION::= SEQUENCE {
initial_downlink_partial_cell_configuration DEDICATED_DOWNLINK_PARTIAL_CELL_CONFIGURATION OPTIONAL,
downlink_partial_cell_box_list SEQUENCE (SIZE (1..integer)) OF DOWNLINK_PARTIAL_CELL_BOX OPTIONAL,
first_downlink_partial_cell_identifier PARTIAL_CELL_IDENTIFIER OPTIONAL,
uplink_Configuration UPLINK_CONFIGURATION OPTIONAL,
supplementary_uplink_configuration UPLINK_CONFIGURATION OPTIONAL,
. . .
}
first_downlink_partial_cell_identifier: This field contains the ID of the downlink partial-cell to be activated.
downlink_partial_cell_box_list: List of additional downlink partial-cells to be added or modified
initial_downlink_partial_cell_configuration: The dedicated (UE-specific) configuration for the initial downlink partial-cell.
supplementary_uplink_configuration: This field contains uplink configuration of supplementary uplink.
uplink_Configuration: This field contains uplink configuration of normal uplink.
UPLINK_CONFIGURATION IE comprises following fields and IEs.
UPLINK_CONFIGURATION::=SEQUENCE {
initial_uplink_partial_cell_configration DEDICATED_UPLINK_PARTIAL_CELL_CONFIGURATION OPTIONAL,
uplink_partial_cell_box_list SEQUENCE (SIZE (1..integer)) OF UPLINK_PARTIAL_CELL_BOX OPTIONAL,
first_uplink_partial_cell_identifier PARTIAL_CELL_IDENTIFIER OPTIONAL,
. . .
}
first_uplink_partial_cell_identifier: This field contains the ID of the uplink partial-cell to be activated.
initial_uplink_partial_cell_configration: The dedicated (UE-specific) configuration for the initial uplink partial-cell.
uplink_partial_cell_box_list: The additional partial-cells for uplink to be added or modified.

The IE CELL_SPECIFIC_CELL_CONFIGURATION is used to configure cell specific parameters of a UE's serving cell.
CELL_SPECIFIC_CELL_CONFIGURATION::=SEQUENCE {
local_cell_identifier LOCAL_CELL_IDENTIFIER OPTIONAL,
common_downlink_confguration COMMON_DOWNLINK_CONFGURATION OPTIONAL,
common_uplink_configuration COMMON_UPLINK_CONFGURATION OPTIONAL OPTIONAL,
common_supplementary_uplink_configuration COMMON_UPLINK_CONFGURATION OPTIONAL OPTIONAL,
. . .
}
local_cell_identifier: indicates the cell identifier of the serving cell that is locally unique. Local_cell_identifier is used in the physical layer processing such as scrambling. Integer between 0 and 1008. common_downlink_confguration: contains the common downlink configuration of the serving cell, including the frequency information configuration and the initial downlink partial-cell common configuration.

common_uplink_configuration: contains the common uplink configuration of the normal uplink.

common_supplementary_uplink_configuration: contains the common uplink configuration of the supplementary uplink.

COMMON_DOWNLINK_CONFGURATION provides common downlink parameters of a cell. This IE comprises a DOWNLINK_FREQUENCY_CONFIGURATION IE and a COMMON_DOWNLINK_PARTIAL_CELL_CONFIGURATION IE.

DOWNLINK_FREQUENCY_CONFIGURATION compreises basic parameters of a downlink carrier.

COMMON_DOWNLINK_PARTIAL_CELL_CONFIGURATION provides downlink partial-cell configuration for an initial donwlink partial-cell.

COMMON_UPLINK_CONFGURATION OPTIONAL provides common uplink parameters of a cell. The IE comprise a UPLINK_FREQUENCY_CONFIGURATION IE and a COMMON_UPLINK_PARTIAL_CELL_CONFIGURATION IE.

UPLINK_FREQUENCY_CONFIGURATION provides absolute uplink frequency configuration and subcarrier specific virtual carriers.

COMMON_UPLINK_PARTIAL_CELL_CONFIGURATION provides uplink partial-cell configuration for an initial uplink partial-cell.

DOWNLINK_PARTIAL_CELL_BOX is used to configure an additional downlink partial-cell (not for the initial partial-cell). DOWNLINK_PARTIAL_CELL_BOX comprises a PARTIAL_CELL_IDENTIFIER and a COMMON_DOWNLINK_PARTIAL_CELL_CONFIGURATION and a DEDICATED_DOWNLINK_PARTIAL_CELL_CONFIGURATION.

COMMON_DOWNLINK_PARTIAL_CELL_CONFIGURATION is used to configure the common parameters of a downlink partial-cell. COMMON_DOWNLINK_PAR- TIAL_CELL_CONFIGURATION comprises a partial_cell_frequency_region field and a COMMON_PDCCH_CONFIGURATION and a COMMON_PDSCH_CONFIGURATION.

DEDICATED_DOWNLINK_PARTIAL_CELL_CONFIGURATION is used to configure the dedicated (UE specific) parameters of a downlink partial-cell. DEDICATED_DOWNLINK_PARTIAL_CELL_CONFIGURATION comprises a DEDICATE_PDCCH_CONFIGURATION and DEDICATE_PDSCH_CONFIGURATION.

DEDICATE_PDSCH_CONFIGURATION comprises a downlinik_or_joint_tci_state_list.

The downlinik_or_joint_tci_state_list includes a downlinik_or_joint_tci_state_to_add_mod_list.

The dl downlinik_or_joint_tci_state_to_add_mod_list includes a list of Transmission Configuration Indicator (TCI) states (TCI-State) indicating a transmission configuration which includes QCL-relationships between the DL RSs in one RS set and the PDSCH DMRS ports and/or PDCCH DMRS ports and/or a DL RS for determining UL TX spatial filter.

A TCI-State comprises a QCL-Info. The QCL-Info comprises following fields.

partial-cell-Id field indicates the dl partial-cell which the RS is located in. If the field is absent, the RS is located in the dl partial-cell in which the TCI-State is applied by the UE.

serving_cell field indicates the UE's serving cell in which the referenceSignal is configured. If the field is absent, it applies to the serving cell in which the TCI-State is applied by the UE.

referenceSignal field indicates reference signal with which quasi-collocation information is provided. It can be either a SSB index or a CSI-RS-ResourceId.

qcl-Type field indicates QCL type. QCL type is either typeA or typeB or typeC or typeD.

UPLINK_PARTIAL_CELL_BOX is used to configure an additional uplink partial-cell (not for the initial partial-cell). UPLINK_PARTIAL_CELL_BOX comprises a PARTIAL_CELL_IDENTIFIER and a COMMON_UPLINK_PARTIAL_CELL_CONFIGURATION and a DEDICATED_UPLINK_PARTIAL_CELL_CONFIGURATION.

COMMON_UPLINK_PARTIAL_CELL_CONFIGURATION is used to configure the common parameters of an uplink partial-cell. COMMON_UPLINK_PARTIAL_CELL_CONFIGURATION comprises a partial_cell_frequency_region field and a COMMON_PUCCH_CONFIGURATION and a COMMON_PUSCH_CONFIGURATION and a DEDICATE_PUSCH_CONFIGURATION and one or more COMMON_RACH_CONFIGURATION.

DEDICATED_UPLINK_PARTIAL_CELL_CONFIGURATION is used to configure the dedicated (UE specific) parameters of an uplink partial-cell. DEDICATED_DOWNLINK_PARTIAL_CELL_CONFIGURATION comprises a DEDICATED_PUCCH_CONFIGURATION and DEDICATED_PUSCH_CONFIGURATION and a one or more LAYER3_GRANT_CONFIGURATION.

COMMON_RACH_CONFIGURATION is used to specify the cell specific random-access parameters for an uplink partial-cell.

Each of one or more COMMON_RACH_CONFIGURATION can be associated with one or more feature combinations.

At least one of COMMON_RACH_CONFIGURATION is not associated with any feature. The COMMON_RACH_CONFIGURATION associatged with no feature (default-common-rach-configuration) is placed first amongst one or more COMMON_RACH_CONFIGURATIONs in the COMMON_UPLINK_PARTIAL_CELL_CONFIGURATION.

Feature combination is set of features. A feature is either a specific group of slices or radio specific technologies (like small data transmission or PRACH repetition). A COMON_RACH_CONFIGURATION can be associated with one or more feature combinations for RPACH resources partition.

COMMON_PDCCH_CONFIGURATION is used to configure cell specific PDCCH parameters. COMMON_PDCCH_CONFIGURATION can comprise up to 4 PDCCH_MONITORING_TIME IEs for common pdcch-monitoring-time. The common pdcch-monitoring-time can be used for SIB1 reception or paging reception or random access response reception.

DEDICATE_PDCCH_CONFIGURATION is used to configure UE specific PDCCH parameters. DEDICATE_PDCCH_CONFIGURATION can comprises up to 10 PDCCH_MONITORING_TIME IEs. The PDCCH_MONITORING_TIME IEs in DEDICATE_PDCCH_CONFIGURATION can be either common pdcch-monitoring-time or UE specific pdcch-monitoring-time.

PDCCH_MONITORING_TIME defines how/where to search for PDCCH candidates.

PDCCH_MONITORING_TIME::=SEQUENCE {
pdcch_monitoring_time_identifier PDCCH_MONITORING_TIME_IDENTIFIER,
monitoring_slot_periodicity_offset CHOICE {
s11 NULL,
s12 INTEGER (0.1),
. . .
} OPTIONAL,
monitoring_duration INTEGER (1..integer) OPTIONAL,
monitoring_symbols_slot BIT STRING (SIZE (14)) OPTIONAL,
number_of_candidates AGGREGATION_LEVEL_CANDIDATE
OPTIONAL,
pdcch_monitoring_type CHOICE {
common_pdcch_monitoring PCS-FORMAT-INFO . . .
terminal_pdcch_monitoring PCS-FORMAT-INFO
}
} common_pdcch_monitoring: Configures this pdcch-monitoring-time as common pdcch-monitoring-time and PCS formats to monitor.

monitoring_duration: Number of consecutive slots that a pdcch-monitoring-time lasts in every occasion, i.e., upon every period as given in the monitoring_slot_periodicity_offset.

monitoring_slot_periodicity_offset: Slots for PDCCH monitoring configured as periodicity and offset.

number_of_candidates: Number of PDCCH candidates per aggregation level.

pdcch_monitoring_type: Indicates whether this is a common pdcch-monitoring-time or a UE specific pdcch-monitoring-time and PCS formats to monitor for.

terminal_pdcch_monitoring: Configures this pdcch-monitoring-time as UE specific pdcch-monitoring-time.

PCS-FORMAT-INFO indicates the format of the set of downlink control information associate with the PDCCH_MONITORING_TIME A subset of the total cell bandwidth of a cell is referred to as a partial-cell. Frequency domain location and bandwidth of a partial-cell is indicated by a partial_cell_frequency_region field. The partial_cell_frequency_region field includes an integer. The integer indicates a starting resource block and a length in terms of contiguously allocated resource blocks.

A partial-cell is either a first type partial-cell or a second type partial-cell.

The first type partial-cell is used by either idle state UE or by connected state UE. The partial_cell_frequency_region field for the first type partial-cell is indicated in a first type serving cell configuration (CELL_SPECIFIC_CELL_CONFIGURATION). The second type partial-cell is used by connected state UE. The partial_cell_frequency_region field for the second type partial-cell is indicated in a second type serving cell configuration (TERMINAL_SPECIFIC_CELL_ CONFIGURATION).

A Physical Layer Control Information Set (PCS) transports a set of downlink control information for one or more cells with one local-terminal-identifier.

local-terminal-identifier is 16 bit locally unique (within a cell) temporary identifier allocated to a UE (or group of UEs).

local-terminal-identifier is either local-scheduling-identifier or local-non-scheduling-identifier.

local-scheduling-identifier used in the current serving cell is:
>1: allocated by local_scheduling_identifier received in the previous serving cell (before handed over to the current cell),
>1: used for scrambling CRC attached to typ1 PCS
>>2: type1 PCS transports uplink scheduling or downlink scheduling,
>>2: type1 PCS has associated shared channel (e.g. PDSCH or PUSCH)
>1: used for identifying the UE in a specific uplink layer2-control-element (i.e. CR layer2-control-element used in the contention resolution)

local-non-scheduling-identifier-layer3 used in the current serving cell is:
>1: allocated by local_non_scheduling_identifier_layer3 received in the current serving cell,
>1: used for scrambling CRC attached to a first type 2 PCS,
>>2: the first type2 PCS transports one or more information blocks,
>>2: the first type2 PCS has no associated shared channel
>1: used for triggering layer 3 related behaviours (or behaviour performed by layer 3) like conditional reconfiguration evaluation.

local-non-scheduling-identifier-layer1 used in the current serving cell is:
>1: allocated by local_non_scheduling_identifier_layer1 received in the current serving cell,
>1: used for scrambling CRC attached to a second type 2 PCS,
>>2: the second type2 PCS transports transmission power control blocks,
>>2: the second type2 PCS has no associated shared channel
>1: used for triggering layer 1 related behaviours (or behaviour performed by layer 1) like uplink transmission power update.

The set of control information included in a PCS is defined per PCS format.

PCS in format-a (PCS-a) includes PUSCH scheduling information. It is addressed by a LOCAL_scheduling_identifier.

PCS in format-b includes PDSCH scheduling information. It is addressed by a LOCAL_scheduling_identifier.

PCS in format-c includes one or more indication blocks. It is addressed by a LOCAL_non_scheduling_identifier_layer3.

PCS in format-d includes one or more transmission power control blocks. It is addressed by a LOCAL_non_scheduling_identifier_layer1.

UE monitors LOCAL_scheduling_identifier during a first specific pdcch-monitoring-time.

UE monitors LOCAL_non_scheduling_identifier_layer3 during a second specific pdcch-monitoring-time.

UE monitors LOCAL_non_scheduling_identifier_layer1 during a third specific pdcch-monitoring-time.

PDCCH_MONITORING_TIME configuring the first specific pdcch-monitoring-time has following fields:
>1: pdcch_monitoring_type is set to terminal_pdcch_monitoring
>1: PCS-FORMAT-INFO in terminal_pdcch_monitoring indicates format-a and format-b PDCCH_MONITORING_TIME configuring the second specific pdcch-monitoring-time has following fields:
>1: pdcch_monitoring_type is set to common_pdcch_monitoring
>1: PCS-FORMAT-INFO in terminal_pdcch_monitoring indicates format-c PDCCH_MONITORING_TIME configuring the third specific pdcch-monitoring-time has following fields:
>1: pdcch_monitoring_type is set to common_pdcch_monitoring
>1: PCS-FORMAT-INFO in terminal_pdcch_monitoring indicates format-d UPLINK_TRANSMISSION_AT_RECONFIGURATION indicatess whether UE shall perform random access procedure in the target special cell or shall use the provided uplink transmission parameters.

UPLINK_TRANSMISSION_AT_RECONFIGURATION::=SEQUENCE {
timing_advance_at_reconfiguration TARGET_TIMING_ADVANCE_OPTIONAL,
uplink_resource_at_reconfiguration CHOICE {
resource_at_uplink
LAYER3_GRANT_CONFIGURATION
resource_at_supplementary_uplink
LAYER3_GRANT_CONFIGURATION
} OPTIONAL
. . .
} timing_advance_at_reconfiguration indicates the timing-advance-number value for the first uplink transmission after reconfiguration to a target special cell. UE applies the amount of timing advance calculated from the product of timing-advance-number and a time unit. If this field is absent, UE is required to determine the timing-advance-number based on its current location and the location of the sattelite and the distance between the sattelite and the base station.

TARGET_TIMING_ADVANCE: indicates timing-advance-number value for the first uplink transmission after reconfgiruation to a target special cell. This IE includes one of following information. An indication that timing-advance-number is equal to zero, an indcation that timing-advance-number to be applied in the target special cell is equal to the latest timing-advance-number used in the source special cell.

uplink_resource_at_reconfiguration indicates the short-term-layer3-grant to be used for a MAC PDU with RRC reconfiguration complete message (or the first MAC PDU to be transmitted in the target special cell or the MAC PDU with first DCCH message).

If resource_at_uplink is present, the short-term-layer3-grant is confiugred in the normal uplink.

If resource_at_supplementary_uplink is present, the short-term-layer3-grant is confiugred in the supplementary uplink.

LAYER3_GRANT_CONFIGURATION is used to configure uplink transmission without dynamic grant in a specific partial-cell.

LAYER3_GRANT_CONFIGURATION::=SEQUENCE {
layer3_grant_periodicity ENUMERATED {sym2, sym7, ...}
layer3_grant_sfn_offset INTEGER (0.5119),
layer3_grant_start_symbol_length INTEGER (0.15),
layer3_grant_frequency_resource BIT STRING (SIZE (18)),
time_reference_sfn ENUMERATED {sfn512} OPTIONAL
ssb_index_bitmap BIT STRING (SIZE (n)) OPTIONAL,
layer3_grant_rsrp_thredhold RSRP-RANGE OPTIONAL
...
} layer3_grant_frequency_resource: Indicates the frequency domain resource allocation determined by the N LSB bits of layer3_grant_frequency_resource. N is determined based on the number of RBs in a specific uplink partial-cell. Denoting the number of RBs to m, N is eaqul to log 2[m*(m+1)/2]. The specific uplink partial-cell is either the partial-cell of which configuration information includes the corresponding LAYER3_GRANT_CONFIGURATION or the initial uplink partial-cell or the partial-cell indicted by first_uplink_partial_cell_identifier.

layer3_grant_frequency_resource corresponds to the starting RB set index and the number of contiguous RB sets.

layer3_grant_periodicity: indicates Periodicity for UL transmission without UL grant.

layer3_grant_start_symbol_length: Indicates a combination of start symbol and length.

layer3_grant_sfn_offset: Offset related to the reference SFN (either 0 or 512).

time_reference_sfn: Indicates SFN used for determination of the offset of a resource in time domain. The UE uses the closest SFN with the indicated number preceding the reception of the configured grant configuration. If the field is not present, the reference SFN is 0.

SSB_index_bitmap: Indicates subset of SSBs for SSB to layer3-grant PUSCH mapping for the short-term-layer3 grant. If this field is present, UE assumes the SSB set (SSBs configured for short-term-layer3-grant) based on this field. If this field is absent, UE assumes the SSB set (SSBs configured for short-term-layer3-grant) includes all actually transmitted SSBs as indicated in ssb_transmission_bitmap in CELL_SPECIFIC_CELL_CONFIGURATION in TARGET_CELL_CONFIGURATION.

layer3_grant_rsrp_threshold: Indicates an RSRP threshold configured for SSB selection for RRC reconfiguration complete message transmission.

CONDITIONAL_RECONFIGURATION is configuration of candidate target SpCell(s) and execution condition(s) for conditional handover, conditional PSCell addition or conditional PSCell change.

CONDITIONAL_RECONFIGURATION comprises following fields and IEs

CONDITIONAL_RECONFIGURATION::=SEQUENCE {
attemp_candidate_rrc_reconfiguration ENUMERATED {true} OPTIONAL,
candidate_rrc_reconfiguration_box_list CANDIDATE_RRC_RECONFIGURATION_BOX_LIST OPTIONAL,
}

CONDITIONAL_RECONFIGURATION field descriptions attemp_candidate_rrc_reconfiguration: If present, the UE shall perform conditional reconfiguration if selected cell is a target candidate cell and it is the first cell selection after failure.

candidate_rrc_reconfiguration_box_list: List of the configuration of candidate SpCells to be added or modified for CHO, CPA or CPC. candidate_rrc_reconfiguration_box_list comprises a one or more CANDIDATE_RRC_RECONFIGURATION_BOX.

CANDIDATE_RRC_RECONFIGURATION_BOX contains configuration of candidate SpCells and associated identifier and information on one or more second type events.

CANDIDATE_RRC_RECONFIGURATION_BOX::= SEQUENCE {
candidate_rrc_reconfiguration_identifier CANDIDATE_RRC_RECONFIGURATION_IDENTIFIER,
candidate_rrc_reconfiguration_execution_condition SEQUENCE (SIZE (1.2)) OF MEASUREMENT_IDENTIFIER OPTIONAL,
candidate_rrc_reconfiguration OCTET STRING (CONTAINING RRC Reconfiguration Message) OPTIONAL,
cell_measurement_based_selection ENUMERATED {true} OPTIONAL,
selection_priority INTEGER (0, . . . , 7) OPTIONAL,
disable_s_measure ENUMERATED {true} OPTIONAL,
associated_rrc_reconfiguration CANDIDATE_RRC_RECONFIGURATION_IDENTIFIER OPTIONAL,
indication_block_index INTEGER (0, . . . , 7) OPTIONAL,
immediate_reconfiguration ENUMERATED {true} OPTIONAL,
}

CANDIDATE_RRC_RECONFIGURATION_BOX field descriptions candidate_rrc_reconfiguration_execution_condition: The execution condition that needs to be fulfilled in order to trigger the execution of a conditional reconfiguration for CHO. This field can include one or two MEASUREMENT_IDENTIFIER of type 2 measurement-identifier.

candidate_rrc_reconfiguration: The RRC Reconfiguration Message to be applied when the condition(s) are fulfilled.

associated_rrc_reconfiguration: indicates associated CANDIDATE_RRC_RECONFIGURATION_BOX. UE applies the candidate_rrc_reconfiguration in the associated CANDIDATE_RRC_RECONFIGURATION_BOX when candidate_rrc_reconfiguration_execution_condition of this CANDIDATE_RRC_RECONFIGURATION_BOX is fulfilled. If this field is present, candidate_rrc_reconfiguration is absent. If this field is absent, candidate_rrc_reconfiguration is present.

indication_block_index: indicates the indication block corresponding to the CANDIDATE_RRC_RECONFIGURATION_BOX (or CANDIDATE_rrc_reconfiguration_identifier). Value n means (n+1)th indication block. If this field is absent, PCS format-c is not applicable to this CANDIDATE_RRC_RECONFIGURATION_BOX.

immediate_reconfiguration: indicates whether this CANDIDATE_RRC_RECONFIGURATION_BOX (or second applicable cell or candidate target cell of this CANDIDATE_RRC_RECONFIGURATION_BOX) is subject to immediate-reconfiguration-upon-reference-signal-stop.

Figure 1D:
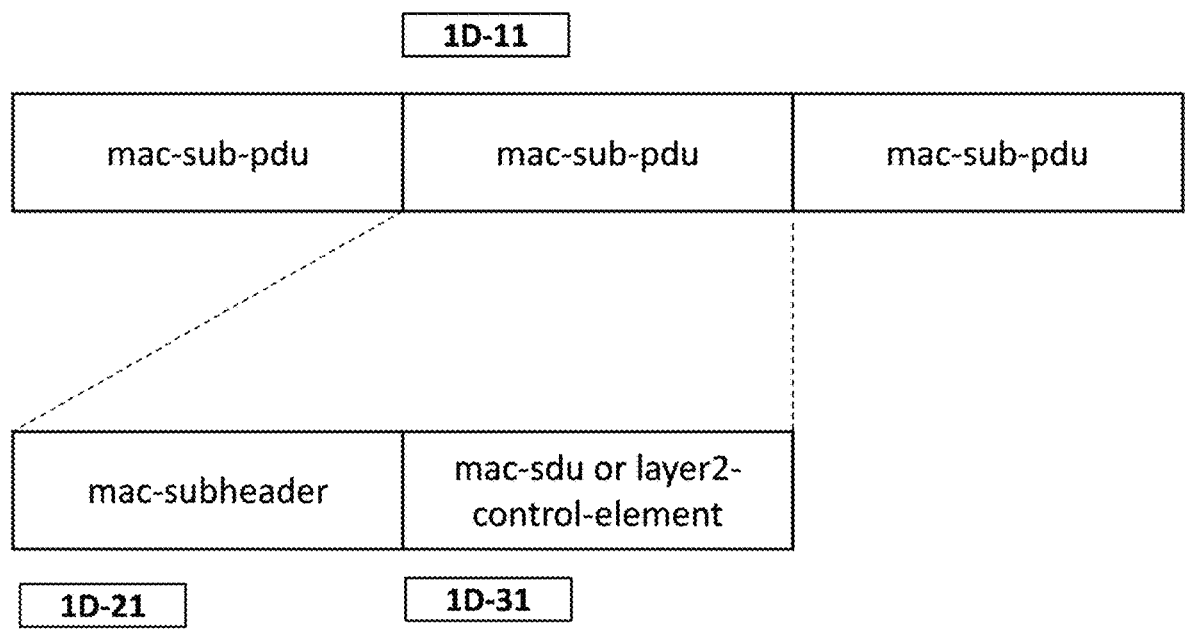
FIG. 1D is a diagram illustrating format of MAC PDU

FIG. 1D illustrates the format of MAC PDU.

A MAC PDU contains one or more mac-sub-pdu 1D-11. A mac-sub-pdu comprises a mac-subheader 1D-21 and a mac-sdu or layer2-control-element 1D-31.

A mac-sdu contains layer3-pdu (e.g. RRC message or PDCP PDU or RLC PDU).

A layer2-control-element contains control information that is generated by MAC and consumed by MAC. The control information included in the layer2-control-element information is control information for MAC.

A mac-subheader associated with mac-sdu consists of a length-field indicating the length of the mac-sdu and a identifier-field indicating the logical channel identifier of the mac-sdu.

A mac-subheader associated with layer2-control-element consists of an identifier-field indicating the type of layer2-control-element.

Figure 2A:
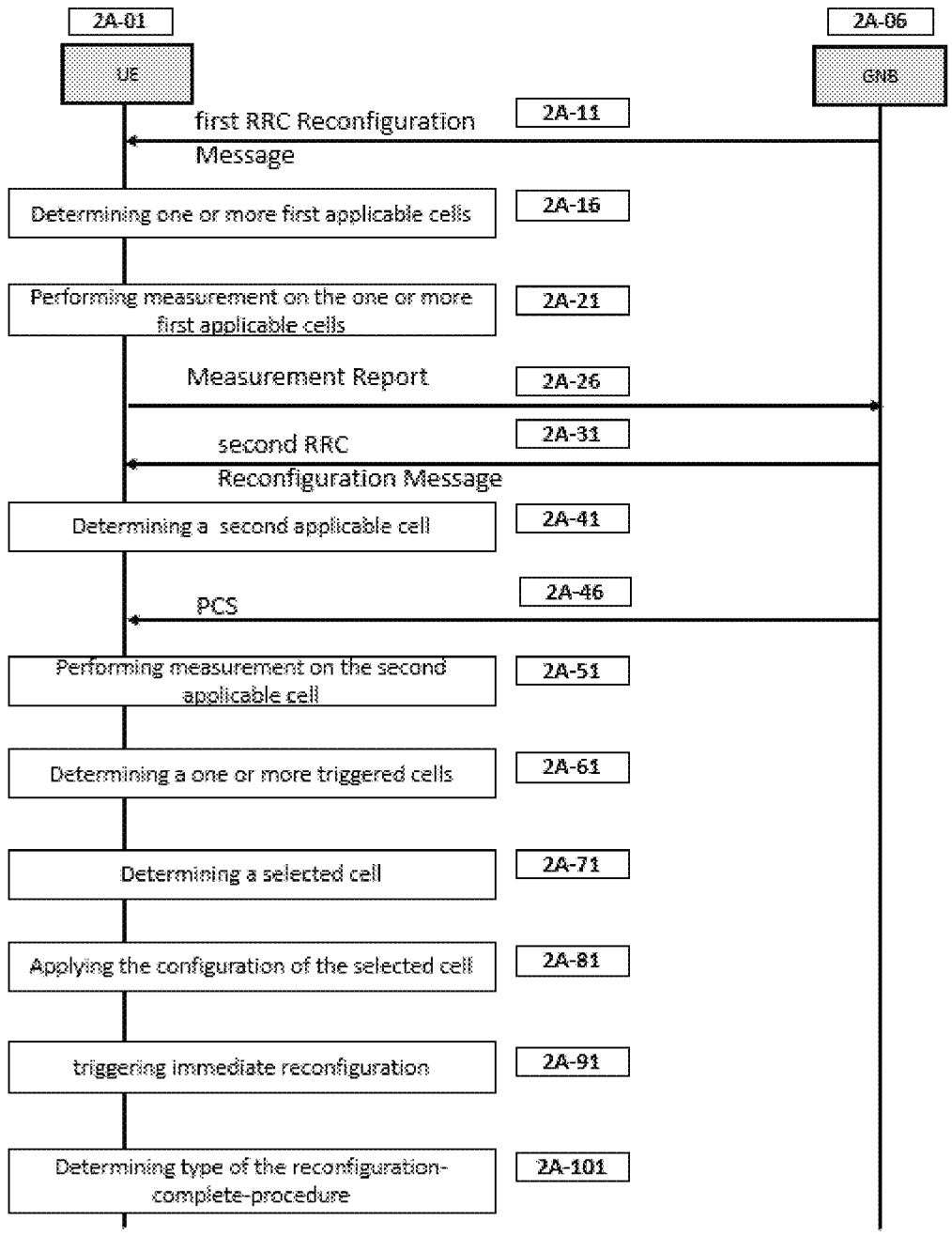
FIG. 2A is a diagram illustrating operations of a terminal and a base station according to an embodiment of the present invention.

FIG. 2A illustrates the operations of the UE and the base station.

2A-11 first RRC Reconfiguration Message

At 2A-11, UE receives a first RRC Reconfiguration Message from a base station. The first RRC Reconfiguration Message may include measurement configuration information (MEASUREMENT_CONFIGURATION). The MEASUREMENT_CONFIGURATION comprises one or more MEASUREMENT_IDENTIFIERs. The MEASUREMENT_identifiers in the MEASUREMENT_CONFIGURATION are either a first type measurement-identifieror or a second type measurement-identifier.

UE stores the received MEASUREMENT_CONFIGURATION in VARIABLE_MEASUREMENT_CONFIGURATION.

2A-16 first applicable cells

At 2A-16, UE determines one or more first applicable cells for each first type measurement-identifier.

UE shall:
>1: if the type1_event_a3 or type1_event_a5 is configured in the corresponding REPORT_CONFIGURATION:
>>2: if a serving cell is associated with a MEASUREMENT_OBJECT_NR and neighbours are associated with another MEASUREMENT_OBJECT_NR, consider any serving cell associated with the other MEASUREMENT_OBJECT_NR to be a neighbouring cell as well. The neighbouring cells are first applicable cells for this first type measurement-identifier.
>1: if the type1_event_a4 is configured in the corresponding REPORT_CONFIGURATION:
>>2: consider any neighbouring cell detected based on parameters in the associated MEASUREMENT_OBJECT_NR to be applicable for this first type measurement-identifier.

2A-21 Performing measurement

At 2A-21, UE performs measurement on the special cell and the one or more first applicable cells.

UE performs measurement on the one or more first applicable cells based on the first set of measurement rules. UE performs measurement on the special cell based on a second set of measurement rules.

In the first set of measurement rules, UE shall:
>1: applies a first measurement cycle.
>>2: The first measurement cycle is determined based on the DRX cycle or based on a measurement_cycle_scell in the associated MEASUREMENT_OBJECT_NR.
>>>3: If the MEASUREMENT_OBJECT_NR is associated with a serving cell (special cell or SCell) and the serving cell is activated, or if the MEASUREMENT_OBJECT_NR is not associated with any serving cell,
>>>>4: the first measurement cycle is equal to the DRX cycle.
>>>3: If the MEASUREMENT_OBJECT_NR is associated with a SCell and the SCell is deactivated,
>>>>4: the first measurement cycle is equal to the measurement_cycle_scell.
>1: perform measurement if RSRP of the special cell is lower than a RSRP threshold.
>1: skip measurement if RSRP of the special cell is higher than the RSRP threshold.
In the second set of measurement rules, UE shall:
>1: applies a second measurement cycle.
>>2: The second measurement cycle is determined based on the DRX cycle or a fixed time value.
>>>3: If DRX is configured, the second measurement cycle is equal to the DRX cycle.
>>>3: If DRX is not configured, the second measurement cycle is equal to the fixed time interval.
>1: perform measurement regardless of RSRP of the special cell being lower than or higher than the RSRP threshold.

A measurement cycle is a periodicity for UE to determine measured result. Every once in a measurement cycle, UE determines a filtered measured result based on a plurality of measurement sample taken at the physical layer.

UE performs measurement on the one or more first applicable cells based on the first filter. UE filters the measured results on the special cell based on the second filter.

The filter coefficient of the first filter is indicated by measurement_quantity_configuration_index in MEASUREMENT_OBJECT_NR associated with the first applicable cell.

The filter coefficient of the second filter is indicated by measurement_quantity_configuration_index in MEASUREMENT_OBJECT_NR associated with the special cell.

L3 filtering

UE filters the measured result, before using for evaluation of reporting criteria or for measurement reporting, by the following formula:

$$F\_n = (1-a)*F\_n-1 + a*M\_n$$

M_n is the latest received measurement result from the physical layer;

F_n is the updated filtered measurement result, that is used for evaluation of reporting criteria or for measurement reporting;

F_n−1 is the old filtered measurement result, where F_0 is set to M_1 when the first measurement result from the physical layer is received; and for MEASUREMENT_OBJECT_NR, $a = 1/2^{(k\_i/4)}$, where k_i is the FILTER_COEFFICIENT for the corresponding measurement quantity of the i:th MEASURE_QAUNTITY_CONFIGURATION_NR in measurement_qauntity_configuration_nr_list, and i is indicated by measurement_quantity_configuration_index in MEASUREMENT_OBJECT_NR;

s-Measure

If REPORT_CONFIGURATION associated with a MEASUREMENT_identifier comprises TYPE1_EVENT_CONFIGURATION, UE may skip measurement on non-serving cells for the MEASUREMENT_identifier based on SKIP_MEASUREMENT_CONFIGURATION and SpCell RSRP.

UE shall:
>1: if SKIP_MEASUREMENT_CONFIGURATION is set to ssb_rsrp and the NR SpCell RSRP based on SS/PBCH block, after layer 3 filtering, is higher than ssb_rsrp, or
>1: if SKIP_MEASUREMENT_CONFIGURATION is set to csi_rsrp and the NR SpCell RSRP based on CSI-RS, after layer 3 filtering, is higher than csi_rsrp:
>>2: does not perform measurement on RSRP or CSI-RS for one or more first applicable cells of the MEASUREMENT_identifier.
>1: if SKIP_MEASUREMENT_CONFIGURATION is set to ssb_rsrp and the NR SpCell RSRP based on SS/PBCH block, after layer 3 filtering, is lower than ssb_rsrp, or
>1: if SKIP_MEASUREMENT_CONFIGURATION is set to csi_rsrp and the NR SpCell RSRP based on CSI-RS, after layer 3 filtering, is lower than csi_rsrp:
>>2: if the measurement-object is associated to NR and the reference_signal_type is set to csi-rs:
>>>3: derive cell measurement results, for one or more first applicable cells, based on CSI-RS for the trigger quantity using parameters from the associated MEASUREMENT_OBJECT_NR;
>>2: if the measurement-object is associated to NR and the reference_signal_type is set to ssb:
>>>3: derive cell measurement results, for one or more first applicable cells, based on SS/PBCH block for the trigger quantity using parameters from the associated MEASUREMENT_OBJECT_NR.

At 2A-26, for each first type measurement-identifier which the measurement reporting procedure was triggered, UE includes the measurement results of the special cell and the measurement results of the one or more first applicable cells in the Measurement Report Message and transmits the Measurement Report Message.

2A-31 second RRC Reconfiguration Message

At 2A-31, UE receives a second RRC Reconfiguration Message from the base station. The second RRC Reconfiguration Message may include conditional reconfiguration information (CONDITIONAL_RECONFIGURATION). The second RRC Reconfiguration Message may include PDCCH configuration information.

A CONDITIONAL_RECONFIGURATION comprises one or more CANDIDATE_RRC_RECONFIGURATION_BOXs.

Each of the one or more CANDIDATE_RRC_RECONFIGURATION_BOXs comprises one or two MEASUREMENT_IDENTIFIERs and a candidate_rrc_reconfiguration.

UE stores the received one or more CANDIDATE_RRC_RECONFIGURATION_BOXs in a VARIABLE_CONDITIONAL_RECONFIGURATION.

At 2A-41, UE determines a second applicable cell for each CANDIDATE_RRC_RECONFIGURATION_IDENTIFIER within the VARIABLE_CONDITIONAL_RECONFIGURATION.

UE shall:
>1: for each CANDIDATE_rrc_reconfiguration_identifier within the VARIABLE_CONDITIONAL_RECONFIGURATION:
>>2: if the CANDIDATE_RRC_RECONFIGURATION_BOX includes an associated_rrc_reconfiguration,
>>>3: if the RRC Reconfiguration Message within a first candidate_rrc_reconfiguration includes the master_cell_group including the TARGET_CELL_CONFIGURATION:
>>>>4: consider the cell which has a local-cell-identifier matching the value indicated in the CELL_SPECIFIC_CELL_CONFIGURATION included in the TARGET_CELL_CONFIGURATION within the master_cell_group in the first candidate_rrc_reconfiguration to be applicable cell (or consider the cell which has a physical cell identity matching the value of target candidate cell within the first candidate_rrc_reconfiguration to be applicable cell).
>>2: if the CANDIDATE_RRC_RECONFIGURATION_BOX does not include an associated_rrc_reconfiguration,
>>>3: if the RRC Reconfiguration Message within a second candidate_rrc_reconfiguration includes the master_cell_group including the target_cell_configuration: or
>>>>4: consider the cell which has a local-cell-identifier matching the value indicated in the CELL_SPECIFIC_CELL_CONFIGURATION included in the TARGET_CELL_CONFIGURATION within the master_cell_group in the second candidate_rrc_reconfiguration to be applicable cell (or consider the cell which has a physical cell identity matching the value of target candidate cell within the first candidate_rrc_reconfiguration to be applicable cell).

The first candidate_rrc_reconfiguration is the candidate_rrc_reconfiguration included in a CANDIDATE_RRC_RECONFIGURATION_BOX indicated by the associated_rrc_reconfiguration. The CANDIDATE_RRC_RECONFIGURATION_BOX including the candidate_rrc_reconfiguration and the CANDIDATE_RRC_RECONFIGURATION_BOX including associated_rrc_reconfiguration are different CANDIDATE_RRC_RECONFIGURATION_BOXs.

The second candidate_rrc_reconfiguration is the candidate_rrc_reconfiguration included in the CANDIDATE_RRC_RECONFIGURATION_BOX associated with the CANDIDATE_rrc_reconfiguration_identifier.

At 2A-46, UE receives from the base station a PCS.

UE monitors PDCCH in a first pdcch-monitoring-time with a first local-terminal-identifier and in a second pdcch-monitoring-time with a second local-terminal-identifier. The first local-terminal-identifier is indicated in PHYSICAL_CELL_GROUP_CONFIGURATION received in the current cell. The second local-terminal-identifier is indicated in TARGET_CELL_INFORMATION received in the previous cell.

If the PCS in format-c is received in the first pdcch-monitoring-time by the first local-terminal-identifier, UE acts upon the information included in PCS format-c.

PCS format-c includes following information.
>1: one or more indication blocks
>>2: Each indication block corresponds to a CANDIDATE_RRC_RECONFIGURATION_IDENTIFIER
>>2: Each indication block consists of two indications.
>>>3: The first indication bit indicates whether measurement on a second applicable cell corresponding to CANDIDATE_rrc_reconfiguration_identifier can be started (and subsequently L3 filtering on the measured result of the second applicable cell).
>>>3: The second indication bit indicates whether conditional reconfiguration evaluation for the corresponding CANDIDATE_rrc_reconfiguration_identifier can be started.
>1: a timing information block
>>2: SFN and subframe number when SSB transmission and CSI-RS transmission and PDCCH transmission and preamble reception and PUCCH reception of this cell (the cell where the PCS is transmitted) will stop.
>1: a first RSRP threshold value for measurement initiation on a second applicable cell
>>2: a threshold for measurement initiation on a second applicable cell. If the RSRP of the special cell is lower than this threshold and if the first indication bit of a indication block is set to a first value, UE is required to start measurement on the second applicable cell.
>1: a second RSRP threshold value for conditional reconfiguration evaluation on a second applicable cell
>>2: a threshold for execution of conditional reconfiguration. If the RSRP of the special cell is lower than this threshold and if the second indication bit of an indication block is set to a first value, UE is required to start conditional reconfiguration evaluation for a CANDIDATE_rrc_reconfiguration_identifier.

If the PCS in format-a or in format-b is received in the second pdcch-monitoring-time by the second local-terminal-identifier, UE performs uplink transmission or downlink reception based on the downlink information in the PCS.

PCS in format-a or in format-b may includes a field indicating TCI-state to be applied.

UE starts measurement on the second applicable cell or evaluate whether conditional reconfiguration can be executed if the PCS format-c is received.

UE performs PUSCH transmission or PDSCH reception if the PCS format-a or PCS format-b is received.

At 2A-51, UE performs measurement on a second applicable cell.

UE performs measurement on the second applicable cell based on the first set of measurement rules during a first measurement time and based on the second set of measurement rules during a second measurement time.

The first measurement time is the period during when NES is not to be applied in a near future. The second measurement time is the period during when NES is to be applied in the near future.

UE determines the first measurement time and the second measurement time based on t1_threshold.

The first measurement time for a second applicable cell is from the point of time when the associated CANDIDATE_RRC_RECONFIGURATION_BOX is received to the point of time indicated by t1_threshold.

The second measurement time for a second applicable cell is from the point of time indicated by t1_threshold to the point of time when RRC reconfiguration occurs or to the point of time indicated by T1_threshold plus EVALUATION_duration, whichever comes first.

In another embodiment, the first measurement time and the second measurement time are determined based on reception of dci format x.

The first measurement time for a second applicable cell is from the point of time when the associated CANDIDATE_RRC_RECONFIGURATION_BOX is received to the point of time when a specific PCS is received.

The second measurement time for a second applicable cell is from the point of time when the specific PCS is received to the point of time when conditional reconfiguration is executed.

The specific PCS:
>1: is in format-c and
>1: is addressed by the first local-terminal-identifier (LOCAL_non_scheduling_identifier_layer3) and
>1: has an indication block corresponding to the CANDIDATE_rrc_reconfiguration_identifier of the second applicable cell and
>1: has the first bit of the indication block is set to the first value and
>1: has the first threshold value that is lower than the special cell's RSRP. (or the special cell's RSRP is lower than the first threshold) UE filters the measured result, before using for evaluation of conditional reconfiguration by the following formula:

$$F\_n=(1-a)*F\_n-1+a*M\_n$$

M_n is the latest received measurement result from the physical layer;
F_n is the updated filtered measurement result, that is used for evaluation of reporting criteria or for measurement reporting;
F_n−1 is the old filtered measurement result, where F_0 is set to M_1 when the first measurement result from the physical layer is received; and for MEASUREMENT_OBJECT_NR, $a=1/2^{(k\_i/4)}$, where k_i is the FILTER_COEFFICIENT for the corresponding measurement quantity of the i:th MEASUREMENT_QAUNTITY_CONFIGURATION_NR in measurement_qauntity_configuration_nr_list, and i is indicated by measurement_quantity_configuration_index_2 in MEASUREMENT_OBJECT_NR; If measurement_quantity_configuration_index_2 is absent, i is indicated by measurement_quantity_configuration_index.

For measurement on SpCell, measurement_quantity_configuration_index in MEASUREMENT_OBJECT_NR for the SpCell is applied.

For measurement on the applicable cell of a MEASUREMENT_IDENTIFIER, measurement_quantity_configuration_index or measurement_quantity_configuration_index_2 in MEASUREMENT_OBJECT_NR associated with the MEASUREMENT_IDENTIFIER is applied.

For a MEASUREMENT_IDENTIFIER, if the skip_measure_disabled field is present (or the skip_measure_disabled is configured) in candidate_rrc_reconfiguration_box, UE performs measurement for the corresponding second applicable cell even when NR SpCell RSRP is higher than ssb_rsrp or csi_rsrp.

In CHO scenario, when the special cell quality is above the threshold configured by the source base station, the UE is not required to perform a first measurements configured by the source base station and required to perform a second measurements configured by the source base station. The first measurement is the measurement configured for measurement reporting. The first measurement is the measurement configured for conditional reconfiguration evaluation and configured without a specific field (skip_measure_disabled). The second measurement is the measurement configured for conditional reconfiguration evaluation and configured with the specific field.

The UE shall, for each MEASUREMENT_IDENTIFIER associated with the second applicable cell,:
>1: if the report_type for the associated REPORT_CONFIGURATION is type2_event_triggered, the MEASUREMENT_IDENTIFIER is within the MCG MEASUREMENT_CONFIGURATION and is indicated in the candidate_rrc_reconfiguration_execution_condition associated to a CANDIDATE_RRC_RECONFIGURATION_IDENTIFIER in the MCG VARIABLE_CONDITIONAL_RECONFIGURATION,
>>2: if SKIP_MEASUREMENT_CONFIGURATION is not configured, or
>>2: if SKIP_MEASUREMENT_CONFIGURATION is configured in MEASUREMENT_CONFIGURATION and skip_measure_disabled is configured in the candidate_rrc_reconfiguration_box, or
>>>3: if SKIP_MEASUREMENT_CONFIGURATION is set to ssb_rsrp and the NR SpCell RSRP based on SS/PBCH block, after layer 3 filtering, is lower than ssb_rsrp and skip_measure_disabled is not configured in the candidate_rrc_reconfiguration_box, or
>>>3: if SKIP_MEASUREMENT_CONFIGURATION is set to csi_rsrp and the NR SpCell RSRP based on CSI-RS, after layer 3 filtering, is lower than csi_rsrp and skip_measure_disabled is not configured in the candidate_rrc_reconfiguration_box:
>>>>4: if the measurement-object is associated to NR and the reference_signal_type is set to csi-rs:
>>>>>5: derive cell measurement results, for one or more first applicable cells, based on CSI-RS for the trigger quantity using parameters from the associated measurement-object;
>>>>4: if the measurement-object is associated to NR and the reference_signal_type is set to ssb:
>>>>>5: derive cell measurement results, for one or more first applicable cells, based on SS/PBCH block for the trigger quantity using parameters from the associated measurement-object.

For each first type measurement-identifier, UE initiates the measurement reporting procedure if all the first type events associated with the first type measurement-identifier are fulfilled for one or more first applicable cells.

For each second type measurement-identifier, UE initiates conditional reconfiguration if all the second type events associated with the second type measurement-identifier are fulfilled for a single second applicable cell.

2A-61 triggered cell

At 2A-61, UE determines one or more triggered cells.

If event(s) associated to all MEASUREMENT_identifier(s) within candidate_rrc_reconfiguration_execution_condition for a target candidate cell within the stored candidate_rrc_reconfiguration (or associated candidate_rrc_reconfiguration) are fulfilled, UE considers the target candidate cell within the stored candidate_rrc_reconfiguration (or associated candidate_rrc_reconfiguration), associated to that CANDIDATE_RRC_RECONFIGURATION_IDENTIFIER, as a triggered cell.

The associated candidate_rrc_reconfiguration is the candidate_rrc_reconfiguration included in a candidate_rrc_reconfiguration_box indicated by the associated_rrc_reconfiguration.

The stored candidate_rrc_reconfiguration is the candidate_rrc_reconfiguration included in the candidate_rrc_reconfiguration_box indicated by the candidate_rrc_reconfiguration_identifier.

At 2A-71, UE determine a selected cell for conditional reconfiguration.

If more than one triggered cell exists, UE selects one of the triggered cells as the selected cell for conditional reconfiguration execution.

UE shall:
>1: if a one or more triggered cell exists,
>>2: if cell_measurement_based_selection is configured for the triggered cell (i.e. cell_measurement_based_selection is present in CANDIDATE_RRC_RECONFIGURATION_BOX associated with the triggered cell);
>>>3: selects a triggered cell based on cell quality of the triggered cell. UE selects a triggered cell with the best cell measurement quality;
>>2: if cell_measurement_based_selection is not configured for the configuration information of the triggered cell (i.e. in CANDIDATE_RRC_RECONFIGURATION_BOX associated with the triggered cell);
>>>3: selects a triggered cell based on beam quality of the triggered cell. UE selects a triggered cell with the best beam quality.

In alternative embodiment,
UE shall:
>1: if a one or more triggered cell exists,
>>2: if selection_priority is configured for the triggered cell (i.e., selection_priority is present in CANDIDATE_RRC_RECONFIGURATION_BOX associated with the triggered cell);
>>>3: selects a triggered cell based on the selection_priority of the triggered cell. UE selects a triggered cell with the highest priority (i.e, lowest value in the selection_priority);
>>2: if selection_priority is not configured for the triggered cell (i.e., selection_priority is absent in CANDIDATE_RRC_RECONFIGURATION_BOX associated with the triggered cell);
>>>3: selects a triggered cell based on beam quality of the triggered cell. UE selects a triggered cell with the best beam quality.

GNB includes a cell_measurement_based_selection in all CANDIDATE_RRC_RECONFIGURATION_BOX IEs or none of CANDIDATE_RRC_RECONFIGURATION_BOX IEs in a CONDITIONAL_RECONFIGURATION.

GNB includes a selection_priority in all CANDIDATE_RRC_RECONFIGURATION_BOX IEs or none of CANDIDATE_RRC_RECONFIGURATION_BOX IEs in a CONDITIONAL_RECONFIGURATION.

If a one or more stored candidate_rrc_reconfiguration fulfils the associated type2_event_triggered, UE selects one of the one or more stored (associated) candidate_rrc_reconfiguration for reconfiguration execution.

At 2A-81, UE applies the stored candidate_rrc_reconfiguration of the selected cell.

The candidate_rrc_reconfiguration includes a RRC Reconfiguration Message. The RRC Reconfiguration Message includes a TARGET_CELL_CONFIGURATION.

Upon applying the RRC Reconfiguration Message included in the stored(or associated) candidate_rrc_reconfiguration of the selected cell, UE shall:
>1: starts timer cell-level-mobility-supervision-timer for the selected cell;
>1: consider the target SpCell to be one on the SSB frequency indicated by the frequencyInfoDL with a physical cell identity indicated by the local_cell_identifier (or consider the target SpCell to be the selected cell), >1: start synchronising to the DL of the target SpCell;
>1: acquire the MIB of the target SpCell;
>1: stop time_alignment_supervision_timer of PTAG and time_alignment_supervision_timer of STAG;
>1: apply the value of the local_scheduling_identifier as the local-scheduling-identifier for this cell group;
>1: configure lower layers in accordance with the received CELL_SPECIFIC_CELL_CONFIGURATION in the TARGET_CELL_CONFIGURATION;
>1: configure lower layers in accordance with any additional fields, not covered in the previous, if included in the received TARGET_CELL_CONFIGURATION;

At 2A-91, UE triggers immediate reconfiguration if the point of time indicated in the timing information block reaches before selected cell (or triggered cell) is determined (i.e., none of the second applicable cells fulfils the conditions of relevant events).

UE performs followings (immediate-reconfiguration-upon-reference-signal-stop) for immediate reconfiguration. immediate reconfiguration is triggered at the point of time indicated in the timing information block in the latest PCS format-c in the current special cell.

UE shall:
>1: identify second applicable cells for immediate reconfiguration.
>>2: a second applicable cell for immediate reconfiguration is the second applicable cell that immediate_reconfiguration is present (or is configured) in the corresponding CANDIDATE_RRC_RECONFIGURATION_BOX.
>1: selects a second applicable cell with best reference signal quality (e.g. highest RSRP) or with best cell measurement result.
>1: consider the second applicable cell and apply the corresponding RRC Reconfiguration message.

At 2A-101, UE determines the type of the reconfiguration procedure for the executed reconfiguration.

cell-level-mobility-reconfiguration-with-layer3-ta: reconfiguration for cell level mobility where the layer 3 timing advance information is indicated in the RRC message for cell level mobility. In this procedure, UE does not perform random access procedure in the target special cell.

cell-level-mobility-reconfiguration-without-layer3-ta: reconfiguration for cell level mobility where the layer 3 timing advance information is not indicated in the RRC message for cell level mobility. In this procedure, UE performs random access procedure in the target special cell to acquire timing advance.

UE shall:
>1: if the TARGET_CELL_CONFIGURATION (or SPECIAL_CELL_CONFIGURATION) includes UPLINK_TRANSMISSION_AT_RECONFIGURATION, and
>>2: if UPLINK_TRANSMISSION_AT_RECONFIGURATION includes LAYER3_GRANT_CONFIGURATION;
>>>3: determines to apply cell-level-mobility-reconfiguration-with-layer3-ta with the layer3-grant;
>>2: if UPLINK_TRANSMISSION_AT_RECONFIGURATION does not include LAYER3_GRANT_CONFIGURATION;
>>>3: determines to apply cell-level-mobility-reconfiguration-with-layer3-ta with the layer1-grant;
>1: if the TARGET_CELL_CONFIGURATION (or SPECIAL_CELL_CONFIGURATION) does not include UPLINK_TRANSMISSION_AT_RECONFIGURATION;
>>2: determines to apply cell-level-mobility-reconfiguration-without-layer3-ta.

A grant collectively denotes the uplink resource (frequency resource in terms of RBs, time resource in terms of symbols) and transmission format (i.e. the size of transport block, modulation and coding scheme etc) for one or more uplink transmission.

layer3-grant is the grant for which uplink resource information and the transmission format information are provided in the layer3 control information such as LAYER3_GRANT_CONFIGURATION.

layer2-grant is the grant for which uplink resource information and the transmission format information are provided in the layer2-control-element such as random-access-response.

layer1-grant is the grant for which uplink resource information and the transmission format information are provided in PCS.

An assignment collectively denotes the downlink resource (frequency resource in terms of RBs, time resource in terms of symbols) and transmission format (i.e. the size of transport block, modulation and coding scheme etc) for one or more downlink reception.

layer1-assignment is the assignment for which downlink resource information and the transmission format information are provided in PCS.

Figure 2B:
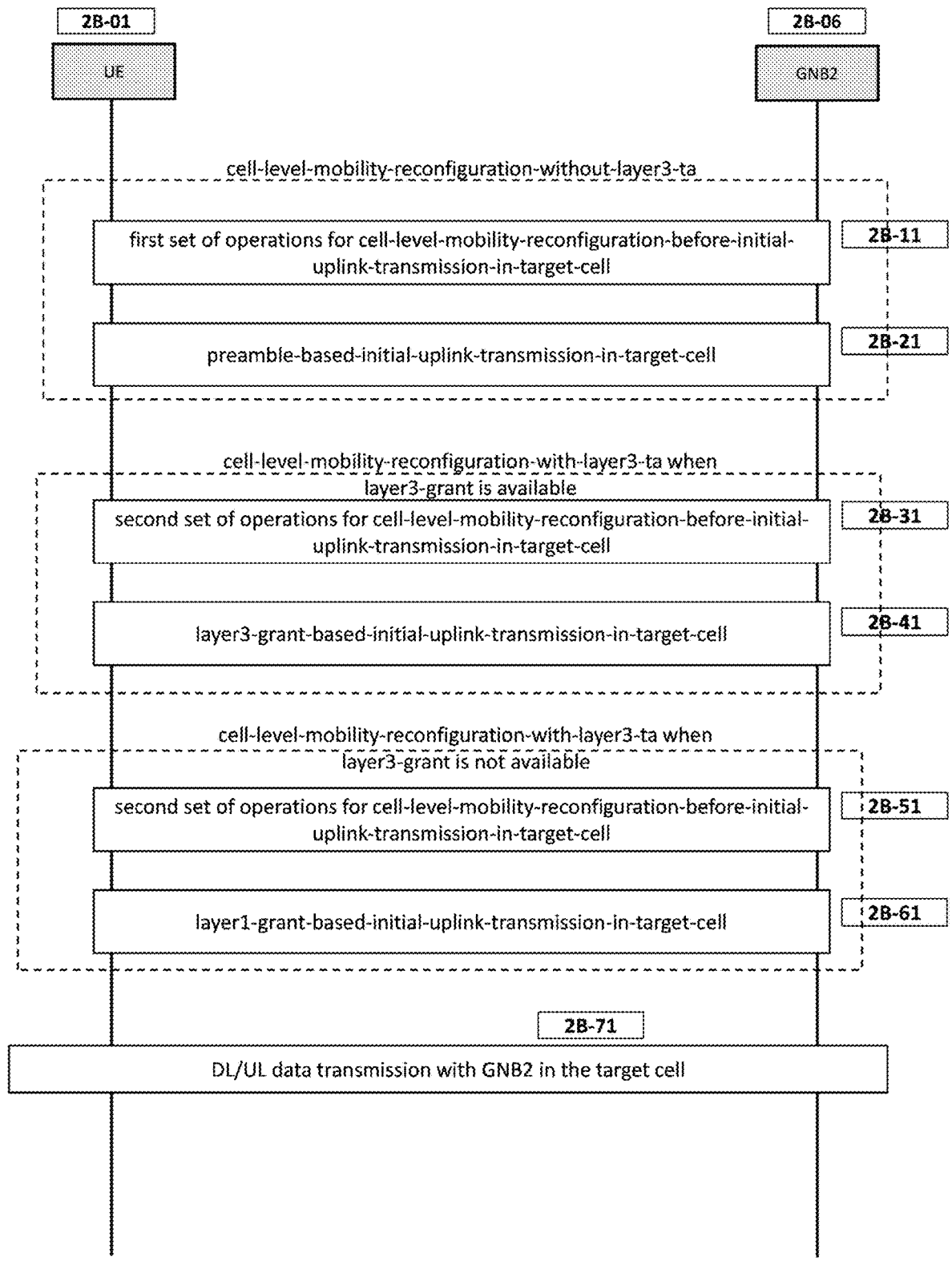
FIG. 2B is a diagram illustrating operations of a terminal and a base station for cell level mobility reconfiguration according to an embodiment of the present invention.

FIG. 2B illustrates the cell-level-mobility-reconfiguration.

For a cell-level-mobility-reconfiguration, UE performs a cell-level-mobility-reconfiguration-before-initial-uplink-transmission-in-target-cell and initial-uplink-transmission-in-target-cell.

UE 2B-01 shall:
>1: If cell-level-mobility-reconfiguration-without-layer3-ta is applied;
>>2: perform a first set of operations for cell-level-mobility-reconfiguration-before-initial-uplink-transmission-in-target-cell 2B-11;
>>2: perform a preamble-based-initial-uplink-transmission-in-target-cell 2B-21;
>1: If cell-level-mobility-reconfiguration-with-layer3-ta is applied;
>>2: performs a second set of operations for cell-level-mobility-reconfiguration-before-initial-uplink-transmission-in-target-cell 2B-31 and 2B-51;
>>2: if layer3-grant for the initial uplink transmission (or short-term-layer3-grant) is configured (LAYER3_GRANT_CONFIGURATION is included in the TARGET_CELL_CONFIGURATION);
>>>3: performs a layer3-grant-based-initial-uplink-transmission-in-target-cell 2B-41;
>>2: if layer3-grant for the initial uplink transmission (or short-term-layer3-grant) is not configured (LAYER3_GRANT_CONFIGURATION is not included in the TARGET_CELL_CONFIGURATION);
>>>3: performs a layer1-grant-based-initial-uplink-transmission-in-target-cell 2B-61.

UE performs DL/UL data reception/transmission with GNB2 2B-06 after successful completion of cell-level-mobility-reconfiguration.

For the first set of operations for cell-level-mobility-reconfiguration-before-initial-uplink-transmission-in-target-cell 2B-11, UE performs followings in the order.

UE shall:
- >1: start cell-level-mobility-supervision-timer with the timer value set to CELL_level_mobility_supervision_timer as included in the TARGET_CELL_CONFIGURATION;
- >1: start synchronising to the DL of the target special cell;
- >1: reset the MAC entity of MCG;
- >1: configure lower layers in accordance with the received CELL_SPECIFIC_CELL_CONFIGURATION in the TARGET_CELL_CONFIGURATION;
- >1: reconfigure the MAC main configuration of MCG in accordance with the received mac_cell_group_configuration;
- >1: consider the partial-cell indicated in first_uplink_partial_cell_identifier, if included in the TERMINAL_SPECIFIC_CELL_CONFIGURATION in the SPECIAL_CELL_CONFIGURATION, to be the active uplink partial-cell;
- >1: submit the RRC reconfiguration complete message via SRB1 to lower layers for transmission using the new configuration.

For the second set of operations for cell-level-mobility-reconfiguration-before-initial-uplink-transmission-in-target-cell 2B-31 and 2B-51, UE performs followings in the order.

UE shall:
- >1: start cell-level-mobility-supervision-timer with the timer value set to CELL_level_mobility_supervision_timer as included in the TARGET_CELL_CONFIGURATION; and
- >1: start synchronising to the DL of the target special cell;
- >1: reset the MAC entity of MCG;
- >1: configure lower layers in accordance with the received CELL_SPECIFIC_CELL_CONFIGURATION in the TARGET_CELL_CONFIGURATION;
- >1: reconfigure the MAC main configuration of MCG in accordance with the received mac_cell_group_configuration;
- >1: consider the partial-cell indicated in first_uplink_partial_cell_identifier, if included in the TERMINAL_SPECIFIC_CELL_CONFIGURATION in the SPECIAL_CELL_CONFIGURATION, to be the active uplink partial-cell;
- >1: apply the TARGET_TIMING_ADVNACE and starts time_alignment_supervision_timer for PTAG (or time_alignment_supervision_timer associated with the target special cell);
- >>2: the amount of timing advance is calculated from the product of a time unit and a sum of a first timing-advance-number and a second timing-advance-number and a third timing-advance-number;
- >1: configured the active uplink partial-cell with the short-term-layer3-grant as indicated in LAYER3_GRANT_CONFIGURATION in TARGET_CELL_CONFIGURATION;
- >1: submit the RRC reconfiguration complete message via SRB1 to lower layers for transmission using the new configuration.

For the preamble-based-initial-uplink-transmission-in-target-cell 2B-21, UE performs followings in the order.
UE shall:
- >1: select an uplink for preamble transmission;
- >>2: if the cell-level-RSRP of the target special cell is higher than threshold_ssb_sul;
- >>>3: select the normal uplink for preamble transmission;
- >>2: if the cell-level-RSRP of the target special cell is equal to or lower than than threshold_ssb_sul;
- >>>3: select the supplementary uplink for preamble transmission;
- >1: transmit a preamble in the selected uplink;
- >1: monitor PDCCH based on fixed-random-access-response-identifier for valid random-access-response reception;
- >1: apply timing-advance-command in the random-access-response and start time_alignment_supervision_timer for primary-timing-advance-group (or time_alignment_supervision_timer associated with the target special cell);
- >>2: timing-advance-command indicates a first timing-advance-number to be applied;
- >>2: the amount of timing advance is calculated from the product of a time unit and a first timing-advance-number and a second timing-advance-number and a third timing-advance-number;
- >1: performs uplink transmission of a MAC PDU based on layer2-grant;
- >>2: the MAC PDU transmitted on the resource indicated in the layer2-grant includes a local-scheduling-identifier layer2-control-element. If possible, the MAC PDU can include at least a part of the RRC reconfiguration complete message;
- >monitor PDCCH based on local-scheduling-identifier;
- >1: consider contention resolution and initial-uplink-transmission-in-target-cell successful when layer1-grant for initial transmission is received in a PCS by the local-scheduling-identifier;
- >1: stop cell-level-mobility-supervision-timer.

fixed-random-access-response-identifier is an identifier used for scrambling CRC attached to PCS scheduling random-access-response.

For the layer3-grant-based-initial-uplink-transmission-in-target-cell 2B-41, UE performs followings in the order.
UE shall:
- >1: perform uplink transmission of a MAC PDU based on layer3-grant in a specific uplink partial-cell in a specific uplink;
- >>2: the specific uplink is explicitly indicated in the uplink_tx_resource_at_reconfiguration;
- >>2: the specific partial-cell is explicitly indicated by first_uplink_partial_cell_identifier;
- >>2: The MAC PDU transmitted on the resource indicated in the layer3-grant include a whole or a part of RRC reconfiguration complete message;
- >1: monitor PDCCH based on local-scheduling-identifier and local-scheduling-identifier-layer3;
- >1: perform uplink retransmission of the MAC PDU if layer1-grant is received by the local-scheduling-identifier-layer3;
- >1: perform downlink reception of a MAC PDU if PCS with downlink assignment is received by local-scheduling-identifier;
- >1: consider initial-uplink-transmission-in-target-cell is successful when a MAC PDU with a specific subheader is received;
- >>2: the specific subheader is subheader of which a specific field is set to a first value;
- >>>3: The specific field can be identifier_field and the first value could be the value corresponding to a layer2-control-element that is not relevant with the current circumstances. For example, since the UE is not performing random access procedure, the layer2-control-element could be the one related with random access procedure. By doing so, UE and GNB can unambiguously share the current situation that GNB has successfully received the MAC PDU with the RRC reconfiguration message and that the procedure is successfully completed;
>1: (alternative) consider initial-uplink-transmission-in-target-cell is successful when layer1-grant for initial transmission is received in a PCS by the local-scheduling-identifier;
>1: (alternative) consider initial-uplink-transmission-in-target-cell is successful when layer1-assignment for initial downlink reception is received in a PCS by the local-scheduling-identifier;
>1: stop cell-level-mobility-supervision-timer.

For the layer1-grant-based-initial-uplink-transmission-in-target-cell 2B-41, UE performs followings in the order. UE shall:
>1: monitor PDCCH based on local-scheduling-identifier;
>1: receive a layer1-grant in a PCS;
>1: perform uplink transmission of a MAC PDU based on the layer1-grant in a specific uplink partial-cell in a specific uplink;
>>2: if the PCS has a field for UL/SUL indication;
>>>3: the specific uplink is the uplink explicitly indicated in the PCS;
>>2: if the PCS does not have a field for UL/SUL indication;
>>>3: the specific uplink is the uplink of which configuration information includes a specific uplink-transmission-related-configuration (e.g. dedicated_pucch_configuration that configures UE specific PUCCH parameters such as PUCCH resource parameters);
>>2: if the PCS has field for partial-cell indication;
>>>3: the specific partial-cell is the partial-cell indicated by the field;
>>2: if the PCS does not have the field;
>>>3: the specific partial-cell is the partial-cell indicated by first_uplink_partial_cell_identifier;
>>2: The MAC PDU transmitted on the resource indicated in the layer1-grant include a whole or a part of RRC reconfiguration complete message;
>1: monitor PDCCH based on local-scheduling-identifier;
>1: perform uplink retransmission of the MAC PDU if layer1-grant is received by the local-scheduling-identifier with the same NDI as the previous one;
>1: perform downlink reception of a MAC PDU if PCS with downlink assignment is received by local-scheduling-identifier;
>1: consider initial-uplink-transmission-in-target-cell is successful when a MAC PDU with a specific subheader is received;
>>2: the specific subheader is subheader of which a specific field is set to a first value;
>>>3: The specific field can be identifier_field and the first value could be the value corresponding to a layer2-control-element that is not relevant with the current circumstances. For example, since the UE is not performing random access procedure, the layer2-control-element could be the one related with random access procedure. By doing so, UE and GNB can unambiguously share the current situation that GNB has successfully received the MAC PDU with the RRC reconfiguration message and that the procedure is successfully completed;
>1: stop cell-level-mobility-supervision-timer.

The first timing-advance-number is indicated by a timing-advance-information in layer3 control information (TARGET_TIMING_ADVNACE in RRC message) or by a timing-advance-information in layer2 control information (timing-advance-command in random-access-response).

The second timing-advance-number is either explicitly indicated in RRC message (within SPECIAL_CELL_CONFIGURATION) or determined based on duplex mode (TDD or FDD) of the target special cell (if not explicitly indicated). The purpose of second timing-advance-number is to provide the time period for uplink and downlink switching in TDD. The purpose of second timing-advance-number is to provide the time period required for coexistence of NR and LTE. The second timing-advance-number is either 0 or 625 or 25600.

The third timing-advance-number is calculated by the UE based on its current location and location of satellite. The purpose of the third timing-advance-number is to compensate the propagation delay between the UE and the satellite.

time_alignment_supervision_timer is indicated in mac_cell_group_configuration. time-alignment-supervision-timer supervises uplink time alignment. This time starts when uplink timing is aligned. Upon expiry, UE consider the uplink timing is not aligned and stop uplink transmission except preamble.

After successful completion of the initial-uplink-transmission-in-target-cell, UE performs uplink transmission and downlink reception with the GNB2 in the target special cell 2B-71.

short-term-layer3-grant can be used during the initial-uplink-transmission-in-target-cell. mid-term-layer3-grant can be used after the initial-uplink-transmission-in-target-cell.

layer3-grant used during the initial-uplink-transmission-in-target-cell is denoted as short-term-layer3-grant in a sense that the layer3-grant is used only for transmission of a specific RRC message during a specific short-term period (i.e., during the time period after applying the TARGET_TIMING_ADVNACE and before reception of a specific MAC PDU).

layer3-grant used after the initial-uplink-transmission-in-target-cell is denoted as mid-term-layer3-grant in a sense that the layer3-grant is recursively used for various types of uplink packets during a specific mid-term period (i.e., during the time period after the layer-3 grant is received and before the layer-3 grant is released).

short-term-layer3-grant and mid-term-layer3-grant are characterized as below.
>1: short-term-layer3-grant is used during an initial-uplink-transmission-in-target-cell. mid-term-layer3-grant is used after an initial-uplink-transmission-in-target-cell;
>1: short-term-layer3-grant is used in an uplink explicitly indicated in TARGET_CELL_CONFIGURATION;
>1: mid-term-layer3-grant is used in an uplink determined based on the parent IE that contains the corresponding LAYER3_GRANT_CONFIGURATION;
>1: short-term-layer3-grant is used in a partial-cell indicated by FIRST_uplink_partial_cell_identifier. mid-term-layer3-grant is used in a partial-cell of which PARTIAL_CELL_UPLINK comprises LAYER3_GRANT_CONFIGURATION of the mid-term-layer3-grant;
>1: The partial-cell for short-term-layer3-grant is determined based on explicit information (identifier). The partial-cell for mid-term-layer3-grant is determined based on implicit information which partial-cell configuration information the layer3-grant information is included;

>1: mid-term-layer3-grant is activated at a first point of time and released at a second point of time and suspended at a third point of time;
>>2: mid-term-layer3-grant is used from the first point of time to the second point of time or from the first point of time to the third point of time;
>>>3: the first point of time is;
>>>>4: when a RRC reconfiguration message including the LAYER3_GRANT_CONFIGURATION for the mide-term-layer3-grant is received; or
>>>>4: when the corresponding partial-cell is activated; or
>>>>4: when the initial-uplink-transmission-in-target-cell is completed and cell-level-mobility-supervision-timer stops;
>>>3: the second point of time is:
>>>>4: when a RRC reconfiguration message including the information to release LAYER3_GRANT_CONFIGURATION for the mide-term-layer3-grant is received; or
>>>>4: when the corresponding partial-cell is deactivated;
>1: short-term-layer3-grant is activated at a fourth point of time and released at a fifth point of time;
>>2: short-term-layer3-grant is used from the fourth point of time to the fifth point of time;
>>>3: the fourth point of time is;
>>>>4: after DL synchronisation to the target special cell (or acquisition of MIB in the target special cell) and before transmission of the RRC reconfiguration complete message; or
>>>>4: after T1_Thresdhold (if configured) and before transmission of the RRC reconfiguration complete message;
>>>3: the fifth point of time is;
>>>>4: when a MAC PDU with a specific subheader is received; or
>>>>4: before evaluation_duration elapsed since T1_Threshold;
>1: the configuration information of the mid-term-layer3-grant and the configuration information of the corresponding partial-cell are indicated in a container for the uplink partial-cell (DEDICATED_UPLINK_PARTIAL_CELL_CONFIGURATION in TERMINAL_SPECIFIC_CELL_CONFIGURATION of SPECIAL_CELL_CONFIGURATION);
>1: the configuration information of the short-term-layer3-grant is indicated in a container for target cell (TARGET_CELL_CONFIGURATION in SPECIAL_CELL_CONFIGURATION) and the configuration information of the corresponding partial-cell is indicated in a container for the uplink partial-cell (in DEDICATED_UPLINK_PARTIAL_CELL_CONFIGURATION in TERMINAL_SPECIFIC_CELL_CONFIGURATION of SPECIAL_CELL_CONFIGURATION if first_uplink_partial_cell_identifier is present; in COMMON_UPLINK_PARTIAL_CELL_CONFIGURATION in COMMON_UPLINK_PARTIAL_CELL_CONFIGURATION in CELL_SPECIFIC_CELL_CONFIGURATION of SPECIAL_CELL_CONFIGURATION if first_uplink_partial_cell_identifier is absent);
>1: the configuration information of the mid-term-layer3-grant and the configuration information of the corresponding partial-cell are indicated in a container for the uplink partial-cell;
>1: the configuration information of the short-term-layer3-grant is included in TERMINAL_SPECIFIC_CELL_CONFIGURATION of SPECIAL_CELL_CONFIGURATION;
>1: the short-term-layer3-grant is used only for transmission of a specific message from a specific logical channel (DCCH);
>1: the mid-term-layer3-grant is used for transmission of various messages and various PDCP SDUs from various logical channels (DCCH and DTCH) and various layer2-control-elements.

cell-level-mobility-supervision-timer is a timer to supervise cell level mobility. When the timer expires, UE consider the cell level mobility procedure failed and starts recovery procedure.

Figure 2C:
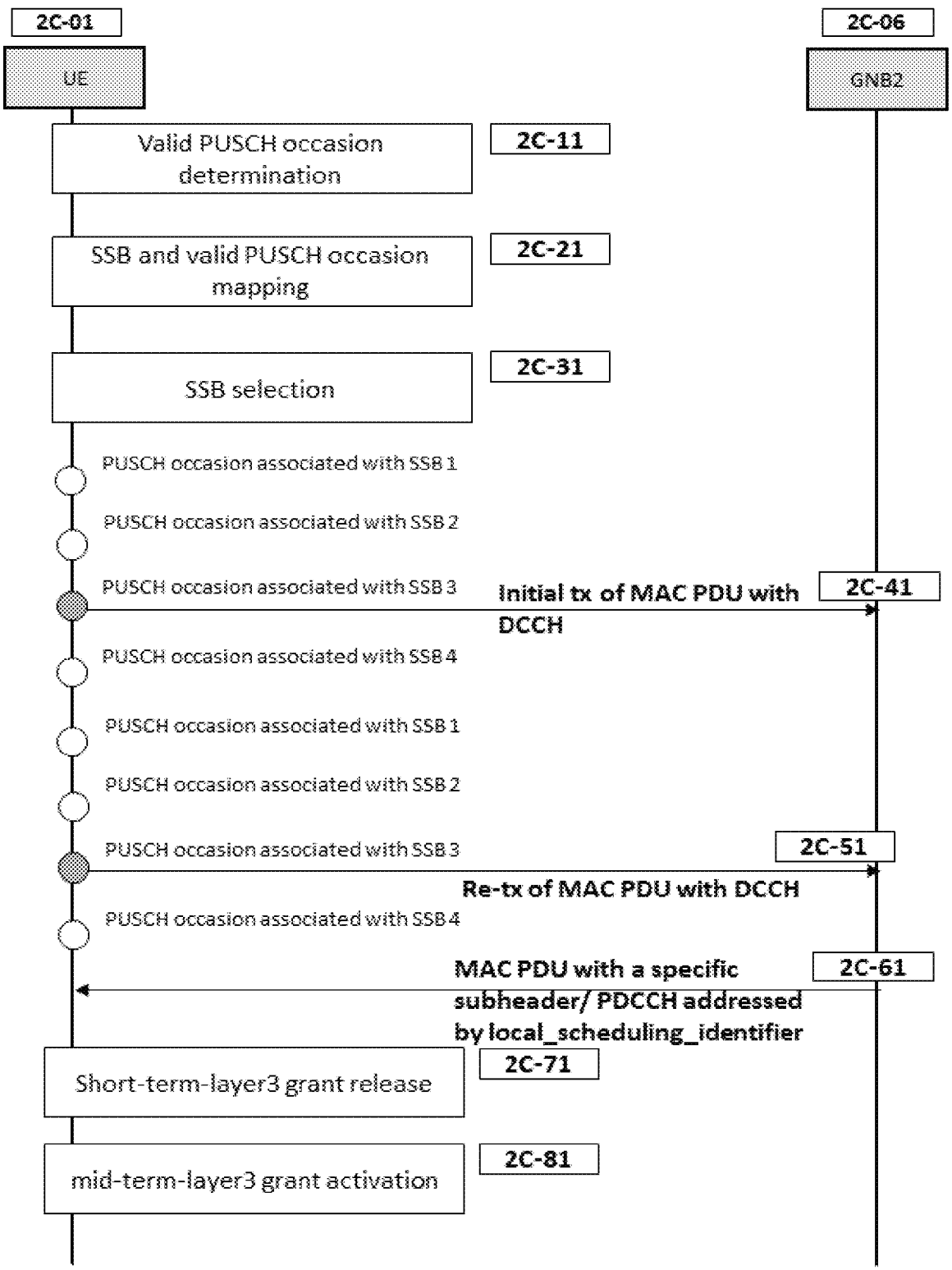
FIG. 2C is a diagram illustrating operations of a terminal and a base station for layer 3 grant according to an embodiment of the present invention.

FIG. 2C illustrates layer3-grant based uplink transmission.

If the RRC Reconfiguration message for cell-level-mobility-reconfiguration includes uplink_resource_at_reconfiguration in TARGET_CELL_CONFIGURATION, UE 2C-01 performs layer3-grant based uplink transmission with GNB2 2C-06 in the target special cell.

At 2C-11, UE determines valid PUSCH occasions of short-term-layer3-grant based on parameters in uplink_resource_at_reconfiguration.

UE consider sequentially that the Nth layer3-grant (or valid PUSCH occasion) occurs in the symbol for which:

$$[(SFN \times numberOfSlotsPerFrame \times numberOfSymbolsPerSlot)+(slot\ number\ in\ the\ frame \times numberOfSymbolsPerSlot)+symbol\ number\ in\ the\ slot]=(time\_reference\_sfn \times numberOfSlotsPerFrame \times numberOfSymbolsPerSlot+layer3\_grant\_sfn\_offset \times numberOfSymbolsPerSlot+S+N \times layer3\_grant\_periodicity) modulo\ (1024 \times numberOfSlotsPerFrame \times numberOfSymbolsPerSlot)$$

S is determined from layer3_grant_start_symbol_length.

At 2C-21, UE determines mapping between valid PUSCH occasions and SSB indexes.

The SSB indexes are indicated by ssb_index_bitmap. The valid PUSCH occasions are determined based on LAYER3_GRANT_CONFIGURATION in UPLINK_TRANSMISSION_AFTER_RECONFIGURATION.

UE determines the mapping between valid PUSCH occasions and SSB indexes as follows.

UE determines a number of SSB indexes (N-SSB-PUSCH) based on ssb_index_bitmap. N-SSB-PUSCH is equal to the number of bits set to 1 in the ssb_index_bitmap.

For an association period, UE maps a first SSB index with the first valid PUSCH occasion and a second SSB index with the second valid PUSCH occasion and so on.

The SSB index corresponding to first bit set to 1 in the ssb_index_bitmap is the first SSB index. The SSB index corresponding to second bit set to 1 in the ssb_index_bitmap is the second SSB index.

For example, if ssb_index_bitmap is 1101, then the first SSB index is SSB 0 and the second SSB index is SSB1 and the third SSB index is SSB3. N-SSB-PUSCH is 3.

The length of the association period is product of periodicity and N-SSB-PUSCH. For example, if N-SSB-PUSCH is 4 and PUSCH configuration period is 5, the association period is 20 ms and the first PUSCH occasion of an association period is mapped to a first SSB index and the second PUSCH occasion of an association period is mapped to a second SSB index and so on.

Each SSB index is mapped with a SSB.

An association period;
- >1: starts from frame with SFN 0 (and subframe number 0);
- >1: is used for mapping SSB indexes to valid PUSCH occasions;
- >1: is the smallest value in the set determined by the PUSCH configuration period provided by periodicity such that N-SSB-PUSCH SSB indexes are mapped at least once to valid PUSCH occasions within the association period.

At 2C-31, UE selects a SSB based on layer3_grant_rsrp_threshold.

UE shall:
- >1: if at least one SSB corresponding to the layer3-grant with RSRP above the layer3_grant_rsrp_threshold is available:
  - >>2: select an SSB with RSRP above layer3_grant_rsrp_threshold amongst the SSB(s) associated with the layer3-grant.
- >1: else if no SSB corresponding to the configured uplink grant with RSRP above the layer3_grant_rsrp_threshold is available
  - >>2: terminate layer3-grant-based-initial-uplink-transmission-in-target-cell
  - >>2: stop time_alignment_supervision_timer for PTAG
  - >>2: release TARGET_TIMING_ADVNACE
  - >>2: release LAYER3_GRANT_CONFIGURATION in TARGET_CELL_CONFIGURATION
  - >>2: initiates preamble-based-initial-uplinkn-transmission-in-target-cell SSB corresponding to layer3-grant is SSB indicated in ssb_index_bitmap.

At 2C-41, UE performs initial transmission of the first MAC PDU in the closest valid PUSCH occasion associated with the selected SSB index.

The first MAC PDU comprises at least a part of a RRC Reconfiguration complete and a local-scheduling-identifier-layer2-control-element. The local-scheduling-identifier-layer2-control-element includes a local-scheduling-identifier.

After performing the initial transmission, UE monitors PDCCH based on the local_scheduling_identifier indicated in TARGET_CELL_CONFIGURATION. If MAC PDU with a specific subheader is not received until the next valid PUSCH occasion associated with the selected SSB index, UE performs retransmission on the PUSCH occasion.

At 2C-51, UE performs retransmission of the first MAC PDU in the next valid PUSCH occasion associated with the selected SSB index At 2C-61, UE receives a MAC PDU with the specific subheader.

At 2c-71, UE releases the short-term-layer3 grant after transmitting HARQ ACK for the MAC PDU.

At 2C-81, UE starts uplink transmission on mid-term-layer3 grant of the current partial-cell. If mid-term-layer3-grant is configured for normal uplink, UE performs uplink transmission in the normal uplink. If mid-term-layer3-grant is configured for supplementary uplink, UE performs uplink transmission in the supplementary uplink.

UE determines valid PUSCH occasions of mid-term-layer3-grant based on parameters in DEDICATED_UPLINK_PARTIAL_CELL_CONFIGURATION of the first partial-cell UE consider sequentially that the Nth layer3-grant (or valid PUSCH occasion) occurs in the symbol for which:

[($SFN$×numberOfSlotsPerFrame×numberOfSymbolsPerSlot)+(slot number in the frame×numberOfSymbolsPerSlot)+symbol number in the slot]=(time_reference_$sfn$×numberOfSlotsPerFrame×numberOfSymbolsPerSlot+layer3_grant_$sfn$_offset×numberOfSymbolsPerSlot+$S$+$N$×layer3_grant_periodicity)modulo (1024×numberOfSlotsPerFrame×numberOfSymbolsPerSlot)

S is determined from layer3_grant_start_symbol_length.

UE can be configured with a list of up to 128 TCI-State configurations in downlinik_or_joint_tci_state_list for providing a reference signal for the quasi co-location for DM-RS of PDSCH and DM-RS of PDCCH and for providing a reference signal for determining UL TX spatial filter for layer1-grant and layer3-grant based PUSCH and PUCCH resource.

The UE receives a activation-layer2-control-element that maps up to 8 pairs of TCI states, with one TCI state for DL channels/signals and/or one TCI state for UL channels/signals to the codepoints of the PCS field transmission_configuration_indication for one for a downlink partial-cell and one for a uplink partial-cell.

After receiving the activation-layer2-control-control-element, UE applies the indicated UL TCI-state for determining UL TX spatial filter for PUSCH transmission scheduled by layer1-grant and mid-term-layer3-grant. The indicated TCI-state does not affect UL TX spatial filter for PUSCH transmission scheduled by short-term-layer-3 grant.

PUSCH occasions of mid-term-layer3-grant are associated with a single SSB or a single TCI state.

If the mid-term-layer3-grant is used after cell-level-mobility-reconfiguration-without-layer3-ta, the PUSCH occasions are associated with a TCI state indicated by a PCS.

If the mid-term-layer3-grant is used after cell-level-mobility-reconfiguration-with-layer3-ta, the PUSCH occasions are associated with a single SSB. The single SSB is the SSB selected for the previous short-term-layer3-grant based PUSCH transmission.

UE performs uplink transmission for mid-term-layer3-grant in the valid PUSCH occasions if they are not part of the measurement gap (if PUSCH occasion and the measurement gap do not overlap with each other).

For the PUSCH transmission based on mid-term-layer3-grant after cell-level-mobility-reconfiguration-with-layer3-ta, UE determines the UL TX spatial filter as below before TCI state is indicated by a PCS or by a layer2-control-information.

- >1: If downlinik_or_joint_tci_state_list in SPECIAL_CELL_CONFIGURATION comprises a single TCI-State;
  - >>2: UE determines UL TX spatial filter from the configured TCI-State;
- >1: If downlinik_or_joint_tci_state_list in SPECIAL_CELL_CONFIGURATION comprises more than one TCI-State or more than one TCI-UL-State;
  - >>2: UE determines UL TX spatial filter is the same as that for PUSCH transmission scheduled by short-term-layer3-grant;
  - >>2: alternatively, UE determines UL TX spatial filter from the SSB selected for PUSCH transmission for the first MAC PDU;
  - >>2: alternatively, UE determines UL TX spatial filter from the SSB associated with PUSCH occasion used for PUSCH transmission of the first MAC PDU;

For the PUSCH transmission based on mid-term-layer3-grant after cell-level-mobility-reconfiguration-withoutlayer3-ta, UE determines the UL TX spatial filter as below before TCI state is indicated by a PCS or by a layer2-control-information.
>1: If downlinik_or_joint_tci_state_list in SPECIAL_CELL_CONFIGURATION comprises a single TCI-State;
>>2: UE determines UL TX spatial filter from the configured TCI-State;
>1: If downlinik_or_joint_tci_state_list in SPECIAL_CELL_CONFIGURATION comprises more than one TCI-State or more than one TCI-UL-State;
>>2: UE determines UL TX spatial filter is the same as that for PUSCH transmission scheduled by RAR UL grant during the random access procedure.

For the PUSCH transmission based on short-term-layer3-grant, UE determines the UL TX spatial filter from the SSB selected for PUSCH occasion for PUSCH transmission of the first MAC PDU.

Alternatively, UE determines the UL TX spatial filter from quasi co-location of the SSB selected for PUSCH occasion for PUSCH transmission of the first MAC PDU.

For cell-level-mobility-reconfiguration-with-layer3-ta, UE selects a SSB from SSBs indicated in ssb_index_bitmap.

For cell-level-mobility-reconfiguration-with-layer3-ta, UE selects a SSB from SSBs indicated in ssb_transmission_bitmap.

ssb_index_bitmap is a subset of ssb_transmission_bitmap. (i.e. the bit set to 1 in ssb_transmission_bitmap can be set to either 0 or 1 in ssb_transmission_bitmap; the bit set to 0 in ssb_transmission_bitmap is set to 0 in ssb_transmission_bitmap.)

ssb_transmission_bitmap is included in CELL_SPECIFIC_CELL_CONFIGURATION.

ssb_transmission_bitmap indicates the time domain positions of the transmitted SSBs in a half frame. The first/leftmost bit corresponds to SSB index 0, the second bit corresponds to SSB index 1, and so on. Value 0 in the bitmap indicates that the corresponding SSB is not transmitted while value 1 indicates that the corresponding SSB is transmitted.

ssb_index_bitmap is included in UPLINK_TRANSMISSION_AT_RECONFIGURATION.

SSB_index_bitmap indicates SSBs, among transmitted SSBs, that can be selected for PUSCH transmission based on short-term-layer3 grant.

Uplink transmission power for PUSCH transmission 2C-41, 2C-51, 2C-81 is determined as below.

Uplink-Transmission-Power=power-offset+pathloss-compensation-coefficient*downlink-pathloss+power-control-component power-offset is configured by parameters in LAYER3_GRANT_CONFIGURATION and PUSCH-Config. Different power-offset can be applied depending on the type of grants.

pathloss-compensation-coefficient is configured by parameters in LAYER3_GRANT_CONFIGURATION and PUSCH-Config. Different pathloss-compensation-coefficient can be applied depending on the type of grants.

downlink-pathloss is a downlink pathloss estimate in dB calculated by the UE using reference signal for a first partial-cell.

power-control-component is accumulated TPC commands so far.

For PUSCH transmission based on short-term-layer3-grant (and during a first period), UE shall:
>1: for power-offset;
>>2: apply value indicated in p0_pusch_short_term if p0_pusch_short_term is included in LAYER3_GRANT_CONFIGURATION in uplink_resource_at_reconfiguration.
>>2: apply value indicated in p0_pusch associated with p0_pusch_alpha if p0_pusch_short_term is not included in LAYER3_GRANT_CONFIGURATION in uplink_resource_at_reconfiguration.
>1: for pathloss-compensation-coefficient;
>>2: apply value indicated in alpha_short_term if alpha_short_term is included in LAYER3_GRANT_CONFIGURATION in uplink_resource_at_reconfiguration.
>>2: apply value indicated in alpha_pusch associated with p0_pusch_alpha if alpha_short_term is not included in LAYER3_GRANT_CONFIGURATION in uplink_resource_at_reconfiguration.

For PUSCH transmission based on mid-term-layer3-grant (and during a second period), UE shall:
>1: for power-offset;
>>2: apply value indicated in p0_pusch associated with p0_pusch_alpha;
>1: for pathloss-compensation-coefficient;
>>2: apply value indicated in alpha_pusch associated with p0_pusch_alpha.

p0_pusch_short_term and alpha_short_term are optinally present in LAYER3_GRANT_CONFIGURATION in uplink_resource_at_reconfiguration.

p0_pusch_alpha is mandatory present in LAYER3_GRANT_CONFIGURATION in uplink_resource_at_reconfiguration.

p0_pusch_short_term includes an integer between −16 and 15.

alpha_short_term includes an enumerated value indicating either 0, 0.4, 05, 0.6, 0.7, 0.8, 0.9 or 1.

p0_pusch_alpha indicates an index of P0_PUSCH_ALPHA_SET.

One or more P0_PUSCH_ALPHA_SET can be included in a DEDICATE_PUSCH_CONFIGURATION.

Each P0_PUSCH_ALPHA_SET consists of the index and alpha_pusch and p0_pusch.

p0_pusch_alpha includes an integer between −16 and 15.

alpha_pusch includes an enumerated value indicating either 0, 0.4, 05, 0.6, 0.7, 0.8, 0.9 or 1.

A DEDICATE_PUSCH_CONFIGURATION can be included in a DEDICATED_UPLINK_PARTIAL_CELL_CONFIGURATION. A DEDICATE_PUSCH_CONFIGURATION is used to configure the UE specific PUSCH parameters applicable to a particular uplink partial-cell.

The first period:
>1: starts;
>>2: when TARGET_TIMING_ADVNACE is applied; or
>>2: when time_alignment_supervision_timer starts; or
>>2: when RRC reconfiguration complete message is generated and submitted to MAC layer for transmission on SRB1; or
>>2: the first partial-cell is considered active;
>1: ends;
>>2: when a MAC PDU with a specific subheader is received; or
>>2: when a layer1-assignment for new transmission is received The second period:
>1: starts when the first period ends;
>1: ends;
>>2: when the layer3-grant is released; or
>>2: when the first partial-cell is deactivated.

By providing separate transmission power related parameters for layer3-grant configured for first MAC PDU transmission, network can ensure that transmission delay of the first MAC PDU is lower and probability of successful transmission of the first MAC PDU is higher that of other MAC PDUs.

By including transform_precoding in default COMMON_RACH_CONFIGURATION, network can reduce signaling overhead.

Figure 2D:
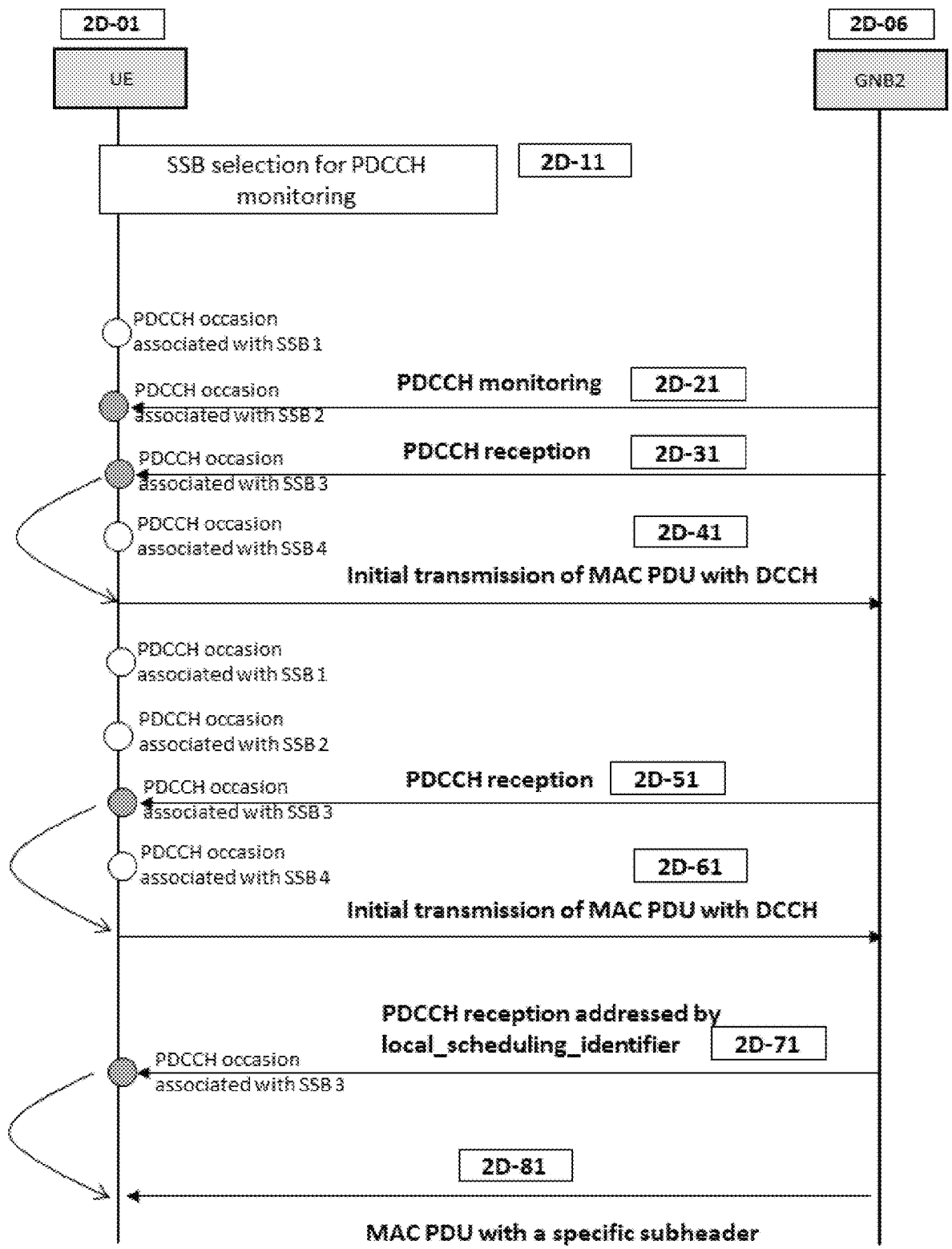
FIG. 2D is a diagram illustrating operation of a terminal and a base station for layer1 grant based initial uplink transmission.

FIG. 2D illustrates layer1-grant-based-initial-uplink-transmission-in-target-cell.

If the RRC Reconfiguration message for cell-level-mobility-reconfiguration includes UPLINK_TRANSMISSION_AT_RECONFIGURATION and does not include uplink_resource_at_reconfiguration in TARGET_CELL_CONFIGURATION in UPLINK_TRANSMISSION_AT_RECONFIGURATION, UE 2D-01 performs layer1-grant based uplink transmission with GNB2 2D-06 in the target special cell.

First MAC PDU and MAC PDU with DCCH SDU are used interchangeably.

At 2D-11, UE selects, for PDCCH monitoring in the target cell, a one or more target-SSBs (or target-TCI-states) based on layer1_grant_rsrp_threshold and ssb_index_bitmap_layer1_grant (or ssb_transmission_bitmap).

layer1_grant_rsrp_threshold and layer1_grant_rsrp_threshold2 and ssb_index_bitmap_layer1_grant can be included in UPLINK_TRANSMISSION_AT_RECONFIGURATION.

UE determines a one or more candidate-SSBs based on ssb_index_bitmap_layer1_grant (or ssb_transmission_bitmap).

UE determines a one or more target-SSBs from the candidate-SSBs based on layer1_grant_rsrp_threshold. If layer1_grant_rsrp_threshold is not included in the UPLINK_TRANSMISSION_AT_RECONFIGURATION, candidate-SSB is target-SSB.

target-SSB is the SSB that provides downlink reference signal for quasi co-location relationship for PDCCH monitoring (i.e. quasi co-location relationship for DM-RS ports of the PDCCH) and for PDSCH reception (i.e. quasi co-location relationship for DM-RS ports of the PDSCH)

For candidate-SSB, UE shall:
>1: if ssb_index_bitmap_layer1_grant is indicated;
>>2: determines a SSBs as candidate-SSB if the corresponding bit of the SSB in ssb_index_bitmap_layer1_grant is set to 1;
>1: if ssb_index_bitmap_layer1_grant is not indicated;
>>determines all SSBs as indicated being transmitted in ssb_transmission_bitmap to be candidate-SSBs.

For target-SSB, UE shall:
>1: if layer1_grant_rsrp_threshold is indicated in UPLINK_TRANSMISSION_AT_RECONFIGURATION;
>>2: if at least one candidate-SSB with SS-RSRP above the layer1_grant_rsrp_threshold is available;
>>>3: determine all candidate-SSBs with SS-RSRP above layer1_grant_rsrp_threshold as target-SSBs;
>>2: if no candidate-SSB with SS-RSRP above the layer1_grant_rsrp_threshold is available;
>>>3: determine the candidate-SSB with best SS-RSRP as a target-SSB if the SS-RSRP is above a layer1_grant_rsrp_threshold2;
>1: if layer1_grant_rsrp_threshold is not indicated in UPLINK_TRANSMISSION_AT_RECONFIGURATION;
>>2: determine all the candidate-SSBs as the target-SSBs.

If UPLINK_TRANSMISSION_AT_RECONFIGURATION includes target_tci_state_list, UE determines a one or more target-TCI-states based on target_tci_state_list.

target_tci_state_list indicates one or more tci-state-identifier. Each of the one or more tci-state-identifier corresponds to a TCI-state of which configuration is included in a DEDICATE_PDSCH_CONFIGURATION of a specific partial-cell of the target special cell. The specific partial-cell is indicated by first_active_partial_cell_identifier.

target-TCI-state provides downlink reference signal for quasi co-location relationship for PDCCH monitoring (i.e. quasi co-location relationship for DM-RS ports of the PDCCH) and for PDSCH reception (i.e. quasi co-location relationship for DM-RS ports of the PDSCH)

Each SSB is associated with a PDCCH occasion. A PDCCH occasion is a time/frequency resource where PDCCH is transmitted/received. Frequency resource of PDCCH occasions for candidate-SSBs are same and provided to the UE in CELL_SPECIFIC_CELL_CONFIGURATION of the target special cell. Time resource of PDCCH occasion of each candidate-SSB is predefined such that time resource of PDCCH occasion associated with candidate-SSB x is n symbols apart from the candidate-SSB x.

Assuming that:
>1: candidate-SSBs are SSB1 and SSB2 and SSB3 and SB4;
>1: target-SSBs are SSB 2 and SSB3;

UE monitors PDCCH occasion associated with SSB2 2D-31 and PDCCH occasion associated with SSB3 2D-41. UE does not monitor PDCCH occasion associated with SSB1 and SSB4.

In monitoring PDCCH occasion associated with a target-SSB, UE assumes that DM-RS of PDCCH is quasi co-located with target-SSB.

UE receives a PCS contained in PDCCH addressed by the local-scheduling-identifier in PDCCH occasion associated with SSB3 2D-31. The PCS includes a layer1-grant for initial transmission for a first HARQ process.

UE performs initial transmission of the MAC PDU with DCCH in the uplink resource indicated by the PCS 2D-41.

After initial transmission, UE monitors PDCCH for retransmission.

For initial transmission, UE monitors PDCCH occasion associated with one or more target-SSBs.

The initial transmission of the MAC PDU is performed based on UL TX spatial filter that is determined from quasi co-location relationship with the second-target-SSB.

For retransmission, UE monitors PDCCH occasion associated with a second-target-SSB. The second-target-SSB is the target SSB of which associated PDCCH occasion carries the layer-1 grant for initial transmission.

UE monitors PDCCH occasion associated with SSB3 (which is second-target-SSB).

UE receives a PCS in the PDCCH occasion associated with SSB3 2D-51. The PCS includes a layer1-grant for retransmission for the first HARQ process.

UE performs retransmission of the first MAC PDU with DCCH in the uplink resource indicated by PCS.

UE receives a PCS in the PDCCH occasion associated with SSB3 2D-71. The PCS is attached with CRC scrambled by the local-scheduling-identifier and includes a layer1-assignment.

UE receives a PDSCH based on the layer1-assignment. The PDSCH includes a MAC PDU with a specific subhead 2D-81.

During and after cell-level-mobility-reconfiguration-with-layer3-ta, UE shall:
>1: if ssb_index_bitmap_layer1_grant is included in UPLINK_TRANSMISSION_AT_RECONFIGURATION;
>>2: for downlink beam management;
>>>3: during a period-before-initial-transmission,
>>>>4: assume that DM-RS of PDSCH and DM-RS of PDCCH are quasi co-located with an associated target-SSB (UE obtains the QCL assumptions from the associated target-SSB);
>>>3: during a period-after-initial-transmission,
>>>>4: assume that DM-RS of PDSCH and DM-RS of PDCCH are quasi co-located with a second-target-SSB (UE obtains the QCL assumptions from the second-target-SSB);
>>>3: during a period-before-initial-transmission,
>>>>4: assume that DM-RS of PDSCH and DM-RS of PDCCH are quasi co-located with a second-target-SSB (UE obtains the QCL assumptions from the second-target-SSB);
>>>3: during a period-after-TCI-indication
>>>>4: assume that DM-RS of PDSCH and DM-RS of PDCCH are quasi co-located with the reference signal of indicated TCI (UE obtains the QCL assumptions from the indicated TCI state);
>>>3: UE performs PDCCH monitoring and PDSCH reception based on the above assumption on QCL assumption;
>>2: for uplink beam management;
>>>3: during a period-before-initial-transmission and during a period-after-initial-transmission and during a period-before-TCI-indication;
>>>>4: assume that UL TX filter for initial transmission (and retransmission) of the MAC PDU with DCCH SDU is determined from quasi co-location relationship with the second-target-SSB (UE obtains the QCL assumption for UL TX filter from the second-target-SSB);
>>>3: during a period-after-TCI-indication,
>>>4: assume that UL TX filter DM-RS of PDSCH and DM-RS of PDCCH are quasi co-located with the reference signal of indicated TCI (UE obtains the QCL assumptions from the indicated TCI state).
>>>3: UE performs PUSCH transmission and PUCCH transmission based on the above assumption on UL TX filter.
>1: if target_TCI_state_list is included in UPLINK_TRANSMISSION_AT_RECONFIGURATION;
>>2: for downlink beam management;
>>>3: during a period-before-initial-transmission and a period-after-initial-transmission,
>>>>4: assume that DM-RS of PDSCH and DM-RS of PDCCH are quasi co-located with a TCI state configured by target-TCI-states;
>>>>>5: if more than one TCI states are configured by target-TCI-state, the TCI state associated with the current search space is selected;
>>>3: during a period-after-TCI-indication;
>>>>4: assume that DM-RS of PDSCH and DM-RS of PDCCH are quasi co-located with the reference signal of indicated TCI (UE obtains the QCL assumptions from the indicated TCI state);
>>>3: UE performs PDCCH monitoring and PDSCH reception based on the above assumption on QCL assumption;
>>2: for uplink beam management;
>>>3: during a period-before-initial-transmission and during a period-after-initial-transmission,
>>>>4: assume that UL TX filter for initial transmission (and retransmission) of the MAC PDU with DCCH SDU is determined from quasi co-location relationship with a TCI state configured by target-TCI-state;
>>>>>5: if more than one TCI states are configured by target-TCI-state, the TCI state used for PDCCH carrying associated layer1-grant is selected;
>>>3: during a period-after-TCI-indication;
>>>>4: assume that UL TX filter DM-RS of PDSCH and DM-RS of PDCCH are quasi co-located with the reference signal of indicated TCI (UE obtains the QCL assumptions from the indicated TCI state).
>>>3: UE performs PUSCH transmission and PUCCH transmission based on the above assumption on UL TX filter.

During and after cell-level-mobility-reconfiguration-without-layer3-ta, UE shall:
>1: for downlink beam management
>>2: during a period-before-TCI-indication;
>>>3: assumes that DM-RS of PDSCH and DM-RS of PDCCH are quasi co-located with the SSB the UE identified during the random access procedure initiated by the cell-level-mobility-reconfiguration-without-layer3-ta;
>>2: during a period-after-TCI-indication;
>>>3: assumes that DM-RS of PDSCH and DM-RS of PDCCH are quasi co-located with the indicated TCI state;
>>>3: UE performs PDCCH monitoring and PDSCH reception based on the above assumption on QCL assumption;
>1: for uplink beam management
>>2: during a period-before-TCI-indication;
>>>3: assumes UL TX spatial filter for layer1-grant based PUSCH transmission is the same as that for a PUSCH transmission scheduled by a RAR UL grant during random access procedure initiated by the cell-level-mobility-reconfiguration-without-layer3-ta;
>>2: during a period-after-TCI-indication;
>>>3: assumes that UL TX spatial filter for layer1-grant based PUSCH transmission is determined from the indicated TCI state.
>>>3: UE performs PUSCH transmission and PUCCH transmission based on the above assumption on UL TX filter.

period-before-initial-transmission is from start-point-period-before-initial-transmission to end-point-period-before-initial-transmission:
>1: start-point-period-before-initial-transmission is either;
>>2: when UE starts PDCCH monitoring in the target special cell; or
>>2: after synchronising to the DL of the target special cell is started and before MAC reset; or
>>2: after configuring lower layers in accordance with the received CELL_SPECIFIC_CELL_CONFIGURATION in the TARGET_CELL_CONFIGURATION and before submitting the RRC reconfiguration complete message via SRB1; or >>2: after activating the uplink partial-cell indicated by indicated in first_uplink_partial_cell_identifier and before applying the TARGET_TIMING_ADVANCE;
>1: end-point-period-before-initial-transmission is;
>>2: when a specific PCS is received in PDCCH addressed by local_scheduling_identifier;
>>>3: the specific PCS is PCS carrying layer1-grant for initial uplink transmission.

period-after-initial-transmission is from start-point-period-after-initial-transmission to end-point-period-after-initial-transmission.
>1: start-point-period-after-initial-transmission is either;
>>2: when period-after-initial-transmission ends; or
>>2: when a specific PCS is received in PDCCH addressed by local_scheduling_identifier;
>>>3: the specific PCS is PCS carrying layer1-grant for initial uplink transmission;
>1: end-point-period-after-initial-transmission is;
>>2: when a specific PCS is received in PDCCH addressed by local_scheduling_identifier; or
>>>3: the specific PCS is PCS carrying layer1-assignment for initial downlink reception;
>>2: when transmission of MAC PDU with DCCH SDU is completed; or
>>2: when when a MAC PDU with a specific subhead is received.

period-before-TCI-indication is from start-point-period-before-TCI-indication to end-point-period-before-TCI-indication.
>1: in association with cell-level-mobility-reconfiguration-with-layer3-ta;
>>2: start-point-period-before-TCI-indication is;
>>>3: after end-point-period-after-initial-transmission;
>>2: end-point-period-before-TCI-indication is;
>>>3: before start-point-period-after-TCI-indication;
>1: in association with cell-level-mobility-reconfiguration-without-layer3-ta;
>>2: start-point-period-before-TCI-indication is;
>>>3: after successful completion of random access procedure initiated for cell-level-mobility-reconfiguration-without-layer3-ta;
>>2: end-point-period-before-TCI-indication is;
>>>3: before start-point-period-after-TCI-indication;

period-after-TCI-indication starts at start-point-period-after-TCI-indication and continues until the partial-cell is deactivated.
>1: for both cell-level-mobility-reconfiguration-with-layer3-ta and cell-level-mobility-reconfiguration-without-layer3-ta;
>>2: start-point-period-after-TCI-indication is;
>>>3: when a TCI state is indicated by a specific field of a PCS;

For cell-level-mobility-reconfiguration-with-layer3-ta, UE shall:
>1: if short-term-layer3-grant is configured;
>>2: select a SSB from SSBs indicated in ssb_index_bitmap
>1: if short-term-layer3-grant is not configured;
>>2: if ssb_index_bitmap_layer1_grant is included in UPLINK_TRANSMISSION_AT_RECONFIGURATION;
>>>3: select a SSB from SSBs indicated in ssb_index_bitmap_layer1_grant.
>>2: else if target_TCI_state_list is included in UPLINK_TRANSMISSION_AT_RECONFIGURATION;
>>>apply the TCI-states in the target_TCI_state_list during period_before_initial_transmission and during period_after_initial_transmission and period_before_TCI_indication.

ssb_index_bitmap_layer1_grant is a subset of ssb_transmission_bitmap. (i.e. the bit set to 1 in ssb_transmission_bitmap can be set to either 0 or 1 in ssb_transmission_bitmap; the bit set to 0 in ssb_transmission_bitmap is set to 0 in ssb_transmission_bitmap.).

ssb_index_bitmap_layer1_grant is included in UPLINK_TRANSMISSION_AT_RECONFIGURATION.

SSB_index_bitmap_layer1_grant indicates SSBs, among transmitted SSBs, that can be selected for PDCCH monitoring and PUSCH transmission during period_before_initial_transmission and during period_after_initial_transmission and during period_before_TCI_indication.

target_TCI_state_list is included in UPLINK_TRANSMISSION_AT_RECONFIGURATION.

target_TCI_state_list comprises one or more TCI-state-identifiers.

A TCI-state-identifier is associated with a TCI-State in downlinik_or_joint_tci_state_to_add_mod_list of a partial-cell of the target special cell.

Transform Precoding is to spread UL data in a specific way to reduce PRPR (Peak-to-Average Power Ratio) of the waveform.

GNB can enable or disable the transform precoding based on RRC parameters; rach-transform-precoder, layer1-grant-transform-precoder and layer3-grant-transform-precoder.

For a specific uplink partial-cell, following transform-precoder related parameters can be provided:
>1: one or more feature-specific-rach-transform-precoder;
>>2: each of feature-specific-rach-transform-precoder controls whether transform precoding is enabled for PUSCH scheduled by RAR or by temporal-local-scheduling-identifier during the random access procedure triggered for a specific feature combination associated with the corresponding COMMON_RACH_CONFIGURATION;
>>>3: temporal-local-scheduling-identifier is used for PUSCH retransmission during random access procedure; temporal-local-scheduling-identifier is indicated in RAR;
>>2: a feature-specific-rach-transform-precoder is indicated in rach_transform_precoding of the corresponding COMMON_RACH_CONFIGURATION;
>1: a default-rach-transform-precoder;
>>2: default-rach-transform-precoder controls whether transform precoding is enalbed for PUSCH scheduled by RAR or by temporal-local-scheduling-identifier during the random access procedure triggered for a specific feature combination that is not associated with any COMMON_RACH_CONFIGURATION;
>>2: default-rach-transform-precoder also controls whether transform precoding is enabled for various PUSCH transmission where dedicate parameter is not configured for transform precoding;
>>2: a default-rach-transform-precoder is indicated in rach_transform_precoding of the default COMMON_RACH_CONFIGURATION;
>1: a layer1-grant-transform-precoder;
>>2: layer1-grant-transform-precoder controls whether transform precoding is enabled for PUSCH scheduled by layer1 grant;

>>layer1-grant-transform-precoder is indicated by layer1_grant_transform_precoding in DEDICATE_PUSCH_CONFIGURATION;
>1: one or more layer3-grant-transform-precoder;
>>2: each of layer3-grant-transform-precoder controls whether transform precoding is enabled for PUSCH scheduled by layer3 grant associated with the layer3-grant-transform-precoder.
>>2: layer3-grant-transform-precoder is indicated by layer3_grant_transform_precoding in the corresponding LAYER3_GRANT_CONFIGURATION.

rach_transform_precoding (layer1_transform_precoding and layer3_transform_precoding) is enumerated with a two values; enabled and disabled.

For a PUSCH transmission in a specific uplink partial-cell, UE determines whether to enable transform precoding or not based on above parameters.

By including transform_precoding in various containers, network can enable or disable transform precoding in diverse scenarios according to its necessity.

By including transform_precoding in default COMMON_RACH_CONFIGURATION, network can reduce signaling overhead.

Terminal performs followings.

Terminal receives from a base station a first RRC message, the first RRC message comprises a measurement configuration information.

Terminal determines a one or more first applicable cells.

The one or more first applicable cells correspond to a first measurement-identifier.

A first measurement-identifier is associated with a first type event.

A first type event is an event for triggering a measurement report. The measurement report is triggered when the first type event is fulfilled.

The one or more first applicable cells are detected cells based on parameters in the MEASUREMENT_OBJECT_NR associated with the first measurement-identifier.

Terminal determines a single second applicable cell.

The single second applicable cell corresponds to a one or two second measurement-identifiers.

The one or more second measurement-identifiers are indicated in a candidate_rrc_reconfiguration_box and associated with a candidate_rrc_reconfiguration in the candidate_rrc_reconfiguration_box. A second measurement-identifier is associated with a second type event.

A second type event is an event for triggering a conditional reconfiguration.

The second applicable cell is a cell indicated target_cell-configuration_information in the candidate_rrc_reconfiguration.

Terminal performs measurement on the one or more first applicable cell based on a first set of measurement rules.

The terminal monitors PDCCH of a first cell (SpCell) with a first local-terminal-identifier (local_non_scheduling_identifier_layer3) during a first time period if a first format for a set of downlink control information is configured for the first time period.

The set of downlink control information in the first format comprises one or more blocks and a time information. Each block corresponds to a candidate_rrc_reconfiguration_identifier.

Terminal receives the set of downlink control information in the first format.

The terminal starts to generate measurement result for layer 3 filtering for a second applicable cell when the set of control information in the specific format is received.

The terminal monitors PDCCH of a second cell (SCell) with a second local-terminal-identifier (local_non_scheduling_identifier_layer1) during a second time period if a second format for a set of downlink control information is configured for the second time period.

The set of downlink control information in the second format comprises one or more transmission power command.

Terminal performs measurement on the second applicable cell based on that the set of downlink control information in the first format is received. The measurement on the second applicable cell is based on the second set of measurement rules.

The second set of measurement rules comprises 1: performing measurement on the second applicable cell if the RSRP of the special cell is lower than the threshold or if the RSRP of the special cell is higher than the threshold and the disable_s_measure is present in the associated candidate_rrc_reconfiguration_box and 2: not performing measurement if the RSRP of the special cell is higher than the threshold and the disable_s_measure is absent in the associated candidate_rrc_reconfiguration_box.

In another embodiment, the second set of measurement rules comprises performing measurement on the second applicable cell not considering the RSRP of the special cell.

Terminal determines the measurement result of the one or more first applicable cells associated with a MEASUREMENT_OBJECT_NR based on a first filter.

Terminal determines the measurement result of the second applicable cell associated with a MeasOjbectNR based on a second filter.

The first filter is indicated in measurement_quantity_configuration_index of MEASUREMENT_OBJECT_NR.

The second filter is indicated in measurement_quantity_configuration_index_2 of MEASUREMENT_OBJECT_NR.

Terminal determines a cell for the conditional reconfiguration based on the measurement result of the second applicable cell.

Terminal determines a cell to be reported based on the measurement result of the one or more first applicable cells.

Terminal selects a cell for conditional reconfiguration from a one or more triggered cells based on priorities of the one or more triggered cells.

Terminal execute conditional reconfiguration based on the determined measurement result and a stored RRC Reconfiguration message.

The stored RRC Reconfiguration message for a second applicable cell is included in a first container. The measurement identifier associated with the measurement result is included in a second container (candidate_rrc_reconfiguration_box). The first container and the second container have different container identifier. The second container includes an information on the identifier of the first container.

Terminal triggers immediate reconfiguration at the SFN and subframe indicated in the set of downlink control information in the specific format.

Terminal receives a first RRC message in a first cell. The first RRC message includes information for reconfiguration to a second cell from the first cell.

Terminal starts a reconfiguration to the second cell.

Terminal transmits a second RRC message in response to the first RRC message in a first uplink of the second cell if the first RRC message does not include UPLINK_TRANSMISSION_AT_RECONFIGURATION. The first uplink is selected based on comparison between THRESHOLD_ssb_sul indicated in the first RRC message and RSRP of downlink pathloss reference of the second cell. threshold_ssb_sul is included in a uplink_partinal_cell_box.

Terminal transmits the second RRC message in a second uplink of the second cell if the first RRC message include UPLINK_TRANSMISSION_AT_RECONFIGURATION. The second uplink is indicated in the UPLINK_TRANSMISSION_AT_RECONFIGURATION. The second uplink is indicated in the first PCS received in the second cell.

Terminal determines that the reconfiguration to the second cell is successful when a specific layer2-control-element is received if the RRC message includes UPLINK_TRANSMISSION_AT_RECONFIGURATION. The specific layer2-control-element is a layer2-control-element used for contention resolution in random access procedure.

Terminal determines that the reconfiguration to the second cell is successful when a CRC scrambled with a first local_scheduling_identifier attached to a specific PCS is received if the RRC message does not includes UPLINK_TRANSMISSION_AT_RECONFIGURATION. The specific PCS includes layer1-grant for initial transmission.

That a RRC message include a specific IE or a specific field means that the RRC message includes child IEs of the specific IE or the child fields of the specific field.

Terminal receives a first RRC message for cell level mobility from a first cell to a second cell.

Terminal starts a time_alignment_supervision_timer associated with the second cell.

Terminal performs uplink transmission in the second cell until the time_alignment_supervision_timer expires.

The time_alignment_supervision_timer is started when timing-advance-information in layer2 control information is received if the first reconfiguration (cell-level-mobility-reconfiguration-without-layer3-ta) is applied. The time_alignment_supervision_timer is started after first uplink transmission in the second cell if the first reconfiguration is applied.

The time_alignment_supervision_timer is started when timing-advance-information in layer3 control information is applied if the second reconfiguration (cell-level-mobility-reconfiguration-with-layer3-ta) is applied. The time_alignment_supervision_timer is started before first uplink transmission in the second cell if the second reconfiguration is applied.

timing-advance-information in layer2 control information is received in the second cell. timing-advance-information in layer2 control information indicates a first-type value for timing-advance. timing-advance-information in layer2 control information is transmitted in layer 2 control information. The first-type value is an integer that represents a specific amount of time derived from the product of the integer and a time unit.

timing-advance-information in layer3 control information is received in the first cell. timing-advance-information in layer3 control information indicates a second-type value for timing-advance. timing-advance-information in layer3 control information is transmitted in layer 3 control information. The second-type value indicates an enumerated value corresponding to either zero timing-advance value or a specific timing-advance value equal to the previously applied timing-advance Terminal receives a RRC message from a first cell.

Terminal determines the type of the reconfiguration based on presence of a first timing-advance-number information.

Terminal determines the timing-advance-number to be applied in the second cell based on the first timing-advance-number and a second timing-advance-number and a third timing-advance-number.

Terminal performs uplink transmission in the second cell.

If the first timing-advance-number information (TARGET_TIMING_ADVNACE) is not included in the RRC message, the terminal performs the first type reconfiguration.

If the first timing-advance-number information is included in the RRC message, the terminal performs the second type reconfiguration.

The first timing-advance-number is determined based on the timing-advance-command received in a layer2-control-information if the first type reconfiguration is applied.

The first timing-advance-number is determined based on the first timing-advance-number information if the second reconfiguration is applied.

The second timing-advance-number is determined based on a second timing-advance-number information in the RRC message if the second timing-advance-number information is included in the RRC message.

The second timing-advance-number is determined based on frequency band (duplex mode) of the second cell if the second timing-advance-number information is not included in the RRC message.

The third timing-advance-number is determined by the terminal based on the location of the terminal.

Terminal receives a RRC message in a first cell.

Terminal starts a cell-level-mobility-supervision-timer.

Terminal stops the cell-level-mobility-supervision-timer when a first event occurs if the RRC message did not include UPLINK_TRANSMISSION_AT_RECONFIGURATION.

Terminal stops the cell-level-mobility-supervision-timer when a second event occurs if the RRC message included UPLINK_TRANSMISSION_AT_RECONFIGURATION.

The first event occurs if an layer-1 grant is received in the second cell after a specific layer2-control-information is transmitted in the second cell and if the CRC of the PCS containing the layer-1 grant is scrambled with the first local_scheduling_identifier. The specific layer2-control-information includes the first local_scheduling_identifier. The first local_scheduling_identifier is indicated in the RRC message.

The second event occurs if a specific mac-subheader is received after at least a part of a second RRC message (RRC reconfiguration message) is transmitted in the second cell. The specific mac-subheader is the mac-subheader with the identifier field set to a first value. The first value indicates that the layer2-control-information is the one related to random access procedure.

Terminal performs uplink transmission based on the first type layer 3 grant in the first partial-cell of first cell during a first period.

Terminal performs uplink transmission based on the second type layer 3 grant in the second partial-cell of first cell during a second period.

The first period is from the first point of time to the second point of time.

The first point of time is determined based on reception of the RRC message configuring the first type layer 3 grant.

The first point of time is determined based on switching to the first partial-cell.

The second period is from the third point of time to the fourth point of time.

The second point of time is determined based on reception of the RRC message releasing the first type layer 3 grant.

The second point of time is determined based on switching from the first partial-cell.

The third point of time is determined based on reception of the RRC message instructing reconfiguration to the second cell.

The third point of time is determined based on downlink synchronization to the second cell.

The third point of time is determined based on t1_Threshold.

The fourth point of time is determined based on reception of physical layer signal scrambled with a first local_scheduling_identifier.

The fourth point of time is determined based on reception of a first layer2-control-element. The first layer2-control-element is received based on scheduling information included in physical layer signal scrambled with a first local_scheduling_identifier.

The fourth point of time is determined based on the sum of t1_Thredhold and duration.

The configuration information of the first type layer 3 grant is indicated in the configuration information of the first partial-cell.

The configuration information of the second type layer 3 grant is indicated in the UPLINK_TRANSMISSION_AFTER_RECONFIGURATION information.

The second partial-cell is indicated by first_uplink_partial_cell_identifier in TERMINAL_SPECIFIC_CELL_CONFIGURATION.

The partial_cell_frequency_region of the second partial-cell is indicated in CELL_SPECIFIC_CELL_CONFIGURATION.

The partial_cell_frequency_region of the first partial-cell is indicated in TERMINAL_SPECIFIC_CELL_CONFIGURATION.

The first type layer 3 grant is transmitted in a partial cell implicitly indicated and the second type layer3 grant is transmitted in a partial cell explicitly indicated.

Terminal performs PUSCH transmission based on layer 3 grant after cell level mobility.

First type PUSCH transmission based on first type layer 3 grant is performed if the cell level mobility is first type cell level mobility (cell-level-mobility-reconfiguration-without-layer3-ta).

Second type PUSCH transmission based on first type layer 3 grant is performed after second type cell level mobility (cell-level-mobility-reconfiguration-with-layer3-ta).

First type PUSCH transmission is performed based on a UL TX spatial filter used for a PUSCH transmission scheduled by a RAR UL grant during the random access procedure for first type cell level mobility (cell-level-mobility-reconfiguration-without-layer3-ta).

Second type PUSCH transmission is performed based on a UL TX spatial filter used for a PUSCH transmission scheduled by second type layer3 grant during second period (after a third point of time and before a fourth point of time) for second type cell level mobility (cell-level-mobility-reconfiguration-without-layer3-ta).

Terminal receives a RRC message for cell level mobility reconfiguration.

Terminal initiates a cell-level-mobility-reconfiguration-without-layer3-ta.

Terminal performs uplink transmission based on the second type layer 3 grant (short-term-layer3-grant) in the first partial-cell of first cell during a second period (after a third point of time and before a fourth point of time).

Terminal performs uplink transmission based on the first type layer 3 grant (mid-term-layer3 grant) in the first partial-cell of first cell during a first period (after a first point of time and before a second point of time).

First type layer 3 grant is associated with a one or more first PUSCH occasions.

The one or more first PUSCH occasions are determined based on a periodicity parameter (layer3_grant_periodicity) and an offset parameter (layer3_grant_sfn_offset) included in a configuration information of the first partial-cell (DEDICATED_UPLINK_PARTIAL_CELL_CONFIGURATION of the first partial-cell).

Transmission of first type layer 3 grant is performed on a one or more second PUSCH occasions.

The one or more second PUSCH occasions are determined based on a measurement configuration (MEASUREMENT_GAP_CONFIGURATION).

The first type layer3 grant is associated with a TCI state indicated by a specific field of a specific PCS.

Transmission on the one or more second PUSCH occasions is performed based a UL TX spatial filter determined from the indicated TCI state.

Second type layer 3 grant is associated with a one or more third PUSCH occasions.

The one or more third PUSCH occasions are determined based on the periodicity parameter and the offset parameter included in a container (UPLINK_TRANSMISSION_AT_RECONFIGURATION) that is different from configuration information of the second partial-cell. The container (UPLINK_TRANSMISSION_AT_RECONFIGURATION) includes timing advance information to be applied for transmission on the one or more fourth PUSCH occasions.

Transmission of second type layer 3 grant is performed on a one or more fourth PUSCH occasions.

The one or more fourth PUSCH occasions are determined based on a bitmap indicated in the container. Each bit of the bitmap is associated with one or two SSBs.

The second type layer3 grant is associated with a one or more SSBs. The SSBs are indicated in the bitmap indicated in the container.

Transmission on the one or more fourth PUSCH occasions is performed based on a UL TX spatial filter determined from the SSB selected from the SSBs indicated in the bitmap.

The selected SSB is selected based on measured RSRP and a threshold indicated in the container.

Terminal receives a RRC reconfiguration message that includes a container (UPLINK_TRANSMISSION_AT_RECONFIGURATION) for second type cell level mobility reconfiguration.

Terminal determines one or more first PUSCH occasions for a layer 3 grant based on a periodicity parameter (layer3_grant_periodicity) and an offset parameter (layer3_grant_sfn_offset) included in the container.

Terminal determines mapping between the one or more first PUSCH occasions and a one or more first SSB indexes. The one or more first SSB indexes are indicated by a bitmap included in the container.

Terminal selects a second SSB from a one or more first SSBs based on a RSRP threshold indicated in the container. The one or more first SSBs are indicated by the one or more first SSB indexes. The second SSB is first SSB of which RSRP is higher than the RSRP threshold.

Terminal performs an initial transmission of a first MAC PDU in first PUSCH occasion associated with the second SSB index based on the layer 3 grant.

Terminal performs a retransmission of a first MAC PDU in first PUSCH occasion associated with the second SSB index based on the layer 3 grant if a specific downlink signal is not received.

The first MAC PDU includes a local-scheduling-identifier-layer2-control-element and at least a part of a RRC reconfiguration complete message.

Terminal receives a RRC reconfiguration message that includes a container (UPLINK_TRANSMISSION_AT_RECONFIGURATION) for second type cell level mobility reconfiguration.

Terminal determines one or more first PUSCH occasions for a layer 3 grant based on a periodicity parameter (layer3_grant_periodicity) and an offset parameter (layer3_grant_sfn_offset) included in the container.

Terminal determines mapping between the one or more first PUSCH occasions and a one or more first SSB indexes. The one or more first SSB indexes are indicated by a bitmap included in the container.

Terminal selects a second SSB from a one or more first SSBs based on a RSRP threshold indicated in the container. The one or more first SSBs are indicated by the one or more first SSB indexes.

Terminal performs transmission of a first MAC PDU in first PUSCH occasion associated with the second SSB index based on the layer 3 grant.

Terminal release the layer 3 grant when a first event occurs.

The first event is expiry of cell_level_mobility_supervision_timer.

The first event is reception of a specific downlink signal. The specific downlink signal is a PCS including a layer1-grant or a layer1-assignment and addressed by local_scheduling_identifier. The specific downlink signal includes a specific subheader.

The first event occurs if a second SSB is not selected (i.e. no first SSB meet the criteria set by the RSRP threshold).

For cell level mobility, UE performs followings.
>1: For cell-level-mobility-reconfiguration, followings are performed by terminal;
>>2: if cell-level-mobility-reconfiguration is initiated by a first RRC message, the first RRC message includes a first TARGET_CELL_CONFIGURATION, the first TARGET_CELL_CONFIGURATION does not include UPLINK_TRANSMISSION_AT_RECONFIGURATION;
>>>3: terminal performs downlink reception for PDCCH and PDSCH based on a first SSB;
>>>>4: the first SSB is the SSB that is quasi co-located with DM-RS for a random access response reception;
>>>>4: the first SSB is selected from a first SSB set, the first SSB set is set of SSBs indicated by a ssb_transmission_bitmap;
>>>>>5: the ssb_transmission_bitmap is included in CELL_SPECIFIC_CELL_CONFIGURATION in the first TARGET_CELL_CONFIGURATION;
>>2: if the cell-level-mobility-reconfiguration is initiated by a second RRC message, the second RRC message includes a second TARGET_CELL_CONFIGURATION, the second TARGET_CELL_CONFIGURATION includes UPLINK_TRANSMISSION_AT_RECONFIGURATION;
>>>3: terminal performs downlink reception for PDCCH and PDSCH based on a second SSB;
>>>>4: the second SSB is the SSB of which SS-RSRP is higher than a RSRP threshold indicated in the UPLINK_TRANSMISSION_AT_RECONFIGURATION;
>>>>4: the second SSB is selected from a second SSB set;
>>>>>5: the second SSB set is set of SSBs indicated by a ssb_index_bitmap_layer1_grant if the ssb_index_bitmap_layer1_grant is included in UPLINK_TRANSMISSION_AT_RECONFIGURATION;
>>>>>5: the second SSB set is set of SSBs indicated by the ssb_transmission_bitmap if the ssb_index_bitmap_layer1_grant is not included in UPLINK_TRANSMISSION_AT_RECONFIGURATION.
>1: For cell-level-mobility-reconfiguration-with-layer3-ta, followings are performed by terminal;
>>2: terminal receives in a source special cell a RRC reconfiguration message instructing cell-level-mobility-reconfiguration towards a target special cell;
>>>3: the RRC reconfiguration message includes UPLINK_TRANSMISSION_AT_RECONFIGURATION;
>>2: during a first period, terminal performs PDCCH monitoring based on a second SSB;
>>>3: the first period starts after a first partial-cell is considered active and ends before reception of a first layer1-grant;
>>>>4: the first partial-cell is the partial-cell of the target special cell indicated by a first_downlink_partial_cell_identifier
>>>>4: the first layer1-grant is a layer1-grant for initial uplink transmission for a first MAC PDU;
>>>>>5: the first MAC PDU is the MAC PDU transmitted first in the target special cell;
>>>>>5: the first MAC PDU includes a local-scheduling-identifier-layer2-control-element and a part of DCCH RRC message;
>>>>>>6: the local-scheduling-identifier-layer2-control-element includes a local-scheduling-identifier indicated in the RRC reconfiguration message;
>>>>>>6: the DCCH message includes a response to the RRC reconfiguration message;
>>>>4: UE is in the source special cell when the first period starts and is in the target special cell when the first period ends;
>>>>4: the second SSB is the SSB of which SS-RSRP is higher than a RSRP threshold indicated in the UPLINK_TRANSMISSION_AT_RECONFIGURATION;
>>>>4: the second SSB is selected from a second SSB set;
>>>>>5: the second SSB set is set of SSBs indicated by a ssb_index_bitmap_layer1_grant if the ssb_index_bitmap_layer1_grant is included in UPLINK_TRANSMISSION_AT_RECONFIGURATION;
>>>>>5: the second SSB set is set of SSBs indicated by the ssb_transmission_bitmap if the ssb_index_bitmap_layer1_grant is not included in UPLINK_TRANSMISSION_AT_RECONFIGURATION.
>>2: during a second period, terminal performs PDCCH monitoring based on a third SSB;

>>>3: the second period starts after reception of the first layer1-grant and ends when a TCI state is indicated by a PCS, the PCS includes a layer1-assignment for initial reception;
>>>3: the third SSB is the SSB associated with the first layer1-grant;
>>>>4: the DM-RS of the PDCCH where the first layer1-grant is received is quasi co-located with the third SSB.
>1: For cell-level-mobility-reconfiguration-with-layer3-ta, followings are performed by terminal;
>>2: terminal receives in a source special cell a RRC reconfiguration message instructing cell-level-mobility-reconfiguration towards a target special cell;
>>>3: the RRC reconfiguration message includes UPLINK_TRANSMISSION_AT_RECONFIGURATION;
>>2: if UPLINK_TRANSMISSION_AT_RECONFIGURATION does not include uplink_resource_at_reconfiguration;
>>>3: terminal assumes DM-RS of PDSCH and DM-RS of PDCCH are quasi co-located with the reference signal associated with a first TCI state during a first period and quasi co-located with the reference signal associated with a second TCI state during a second period;
>>>>4: the first TCI state is indicated in UPLINK_TRANSMISSION_AT_RECONFIGURATION received in the source special cell;
>>>>4: the second TCI state is indicated in a specific field of a layer1-assignment received in the target special cell;
>>>>4; the first period starts when a first partial-cell is considered active and ends when a TCI state is indicated by a PCS, the PCS includes a layer1-assignment for initial reception;
>>>>>5: the first partial-cell is the partial-cell of the target special cell indicated by a first_downlink_partial_cell_identifier;
>>>>4: the second period starts when the first period ends and ends when the first partial-cell is deactivated;
>>2: if UPLINK_TRANSMISSION_AT_RECONFIGURATION includes uplink_resource_at_reconfiguration;
>>>3: terminal assumes DM-RS of PDSCH and DM-RS of PDCCH are quasi co-located with a second SSB during a first period and quasi co-located with the reference signal associated with a second TCI state during a second period;
>>>>4: the second SSB is the SSB of which SS-RSRP is higher than a RSRP threshold indicated in the UPLINK_TRANSMISSION_AT_RECONFIGURATION;
>>>>4: the second SSB is selected from a second SSB set;
>>>>>5: the second SSB set is set of SSBs indicated by a ssb_index_bitmap_layer1_grant if the ssb_index_bitmap_layer1_grant is included in UPLINK_TRANSMISSION_AT_RECONFIGURATION;
>>>>>5: the second SSB set is set of SSBs indicated by the ssb_transmission_bitmap if the ssb_index_bitmap_layer1_grant is not included in UPLINK_TRANSMISSION_AT_RECONFIGURATION.
>1: For determining transform precoding during and after cell-level-mobility-reconfiguration, followings are performed by terminal;

>>2: terminal receives a RRC message in a first cell, the RRC message can include a UPLINK_TRANSMISSION_AT_RECONFIGURATION and a one or more COMMON_UPLINK_PARTIAL_CELL_CONFIGURATION and a one or more DEDICATE_UPLINK_PARTIAL_CELL_CONFIGURATION and a first_active_partial_cell_identifier for a second cell;
>>2: terminal starts cell-level-mobility-supervision-timer;
>>2: terminal determines whether to enable or disable transform precoding in the second cell;
>>>3: during a third period;
>>>>4: the third period;
>>>>>5: comprises a period-before-initial-transmission and a period-after-initial-transmission; or
>>>>>5: is while cell-level-mobility-supervision-timer is running (after starts and before stops);
>>>>4: if the RRC message includes UPLINK_TRANSMISSION_AT_RECONFIGURATION (cell-level-mobility-reconfiguration-with-ta);
>>>>>5: if a second-transform-precoder is included in the DEDICATE_PUSCH_CONFIGURATION for the partial-cell indicated by the first_active_partial_cell_identifier;
>>>>>>6: terminal consider (determine) transform precoding either enabled or disabled according to the second-transform-precoder;
>>>>>5: if a second-transform-precoder is not included in the DEDICATE_PUSCH_CONFIGURATION for the partial-cell indicated by the first_active_partial_cell_identifier;
>>>>>>6: terminal consider (determine) transform precoding either enabled or disabled according to the specific first-transform-precoder;
>>>>4: if the RRC message does not include UPLINK_TRANSMISSION_AT_RECONFIGURATION (cell-level-mobility-reconfiguration-without-ta);
>>>>>5: terminal consider (determine) transform precoding either enabled or disabled according to the specific first-transform-precoder;
>>>3: during a fourth period;
>>>>4: the fourth period starts;
>>>>>5: when period-after-initial-transmission ends or
>>>>>5: when cell-level-mobility-supervision-timer stops;
>>>>4: the fourth period ends;
>>>>>5: when the uplink-partial-cell deactivated; or
>>>>>5: when another cell-level-mobility-reconfiguration is initiated; or
>>>>>5: when RRC state transition to IDLE or INACTIVE occurs; or
>>>>>5: when radio link failure occurs;
>>>>4: if a second-transform-precoder is included in the DEDICATE_PUSCH_CONFIGURATION for the partial-cell indicated by the first_active_partial_cell_identifier;
>>>>>5: terminal consider (determine) transform precoding either enabled or disabled according to the second-transform-precoder;
>>>>4: if a second-transform-precoder is not included in the DEDICATE_PUSCH_CONFIGURATION for the partial-cell indicated by the first_active_partial_cell_identifier;
>>>>>5: terminal consider (determine) transform precoding either enabled or disabled according to the specific first-transform-precoder;

>>2: terminal performs PUSCH transmission based on the determination in the second cell.
>1: For determining transform precoding during and after cell-level-mobility-reconfiguration, followings are performed by terminal;
>>2: terminal receives a RRC message in a first cell, the RRC message can include a UPLINK_TRANSMISSION_AT_RECONFIGURATION and a one or more COMMON_UPLINK_PARTIAL_CELL_CONFIGURATION and a one or more DEDICATE_UPLINK_PARTIAL_CELL_CONFIGURATION and a first_active_partial_cell_identifier for a second cell;
>>>3: a COMMON_UPLINK_PARTIAL_CELL_CONFIGURATION can include one or more transform_precoder;
>>>>4: the transform_precoder indicates a first-transform-precoder (rach-transform-precoder)
>>>3: a DEDICATE_PUSCH_CONFIGURATION in a DEDICATE_UPLINK_PARTIAL_CELL_CONFIGURATION can include a transform_precoder;
>>>>4: the transform_precoder indicates a second-transform-precoder (layer1-grant-transform-precoder);
>>>3: each of one or more LAYER3_GRANT_CONFIGURATION in a DEDICATE_UPLINK_PARTIAL_CELL_CONFIGURATION can include a transform_precoder;
>>>>4: the transform_precoder indicates a third-transform-precoder (layer3-grant-transform-precoder);
>>>3: a LAYER3_GRANT_CONFIGURATION in the UPLINK_TRANSMISSION_AT_RECONFIGURATION can include a transform_precoder;
>>>>4: the transform_precoder indicates a third-transform-precoder (layer3-grant-transform-precoder);
>>2: terminal determines whether to enable or disable transform precoding in the second cell;
>>>3: if a second-transform-precoder is included in the DEDICATE_PUSCH_CONFIGURATION for the partial-cell indicated by the first_active_partial_cell_identifier;
>>>>4: terminal consider (determine) transform precoding either enabled or disabled according to the second-transform-precoder;
>>>3: if a second-transform-precoder is not included in the DEDICATE_PUSCH_CONFIGURATION for the partial-cell indicated by the first_active_partial_cell_identifier;
>>>>4: terminal consider (determine) transform precoding either enabled or disabled according to a specific first-transform-precoder;
>>>>>5: the specific first-transform-precoder is selected from one or more first-transform-precoder associated with the partial-cell indicated by the first_active_partial_cell_identifier;
>>>>>5: terminal determines the specific first-transform-precoder is the first-transform-precoder associated with a COMMON_RACH_CONFIGURATION which is not associated with any feature.
>1: For determining transform precoding during and after cell-level-mobility-reconfiguration, followings are performed by terminal;
>>2: terminal receives a RRC message in a first cell, the RRC message can include a UPLINK_TRANSMISSION_AT_RECONFIGURATION and a one or more COMMON_UPLINK_PARTIAL_CELL_CONFIGURATION and a one or more DEDICATE_UPLINK_PARTIAL_CELL_CONFIGURATION and a first_active_partial_cell_identifier for a second cell;
>>2: terminal starts cell-level-mobility-supervision-timer;
>>2: terminal determines whether to enable or disable transform precoding in the second cell;
>>>3: during the third period;
>>>>4: if a third-transform-precoder is included in uplink_resource_at_reconfiguration in the UPLINK_TRANSMISSION_AT_RECONFIGURATION;
>>>>>5: terminal consider (determine) transform precoding, for initial transmission of the first MAC PDU on PUSCH, either enabled or disabled according to the third-transform-precoder;
>>>>>5: terminal consider (determine) transform precoding, for retransmission of the first MAC PDU on PUSCH, either enabled or disabled according to the third-transform-precoder;
>>>>4: if a third-transform-precoder is not included in uplink_resource_at_reconfiguration in the UPLINK_TRANSMISSION_AT_RECONFIGURATION;
>>>>>5: terminal consider (determine) transform precoding, for initial transmission of the first MAC PDU on PUSCH, either enabled or disabled according to the specific first-transform-precoder;
>>>>>5: terminal consider (determine) transform precoding, for retransmission of the first MAC PDU on PUSCH, either enabled or disabled according to the specific first-transform-precoder;
>>>3: during the fourth period;
>>>>4: if a third-transform-precoder is included in the LAYER3_GRANT_CONFIGURATION in UPLINK_PARTIAL_CELL_CONFIGURATION;
>>>>>5: terminal consider (determine) transform precoding, for initial transmission of a MAC PDU on PUSCH, either enabled or disabled according to the third-transform-precoder;
>>>>>5: terminal consider (determine) transform precoding, for retransmission of the MAC PDU on PUSCH, either enabled or disabled according to the second-transform-precoder;
>>>>4: if a third-transform-precoder is not included in the LAYER3_GRANT_CONFIGURATION in UPLINK_PARTIAL_CELL_CONFIGURATION;
>>>>>5: terminal consider (determine) transform precoding, for initial transmission on PUSCH, either enabled or disabled according to the specific first-transform-precoder;
>>>>>5: terminal consider (determine) transform precoding, for retransmission on PUSCH, either enabled or disabled according to the second-transform-precoder.
>1: For uplink transmission power determination during and after cell-level-mobility-reconfiguration, followings are performed by terminal;
>>2: terminal receives a RRC message, the RRC message includes a uplink_resource_at_reconfiguration and one or more DEDICATE_PUSCH_CONFIGURATION and a first_active_partial_cell_identifier;
>>>3: each of the one or more DEDICATE_PUSCH_CONFIGURATION is associated with an uplink partial-cell.
>>2: terminal determines uplink transmission power for layer3-grant based transmission;
>>>3: transmission power is determined based on a first power offset and a first pathloss compensation coefficient;

>>>>4: during the third period;
>>>>>5: the first power offset is determined based on;
>>>>>>6: a first parameter (p0_pusch_short_term) indicating an integer if the first parameter is included in the uplink_resource_at_reconfiguration; or
>>>>>>6: a third parameter (p0_pusch_alpha) indicating an index of a parameter set (P0_PUSCH_ALPHA_SET) if the first parameter is not included in the uplink_resource_at_reconfiguration;
>>>>>>5: the first pathloss compensation coefficient is determined based on;
>>>>>>6: a second parameter (alpha_short_term) indicating an enumerated value if the second parameter is included in the uplink_resource_at_reconfiguration; or
>>>>>>6: a third parameter (p0_pusch_alpha) indicating an index of a parameter set (P0_PUSCH_ALPHA_SET) if the second parameter is not included in the uplink_resource_at_reconfiguration; . . .
>>>>4: during the fourth period;
>>>>>5: the first power offset is determined based on;
>>>>>>6: the third parameter (p0_pusch_alpha) indicating an index of a parameter set (P0_PUSCH_ALPHA_SET);
>>>>>5: the first pathloss compensation coefficient is determined based on;
>>>>>>6: the third parameter (p0_pusch_alpha) indicating an index of a parameter set (P0_PUSCH_ALPHA_SET).

Figure 3:
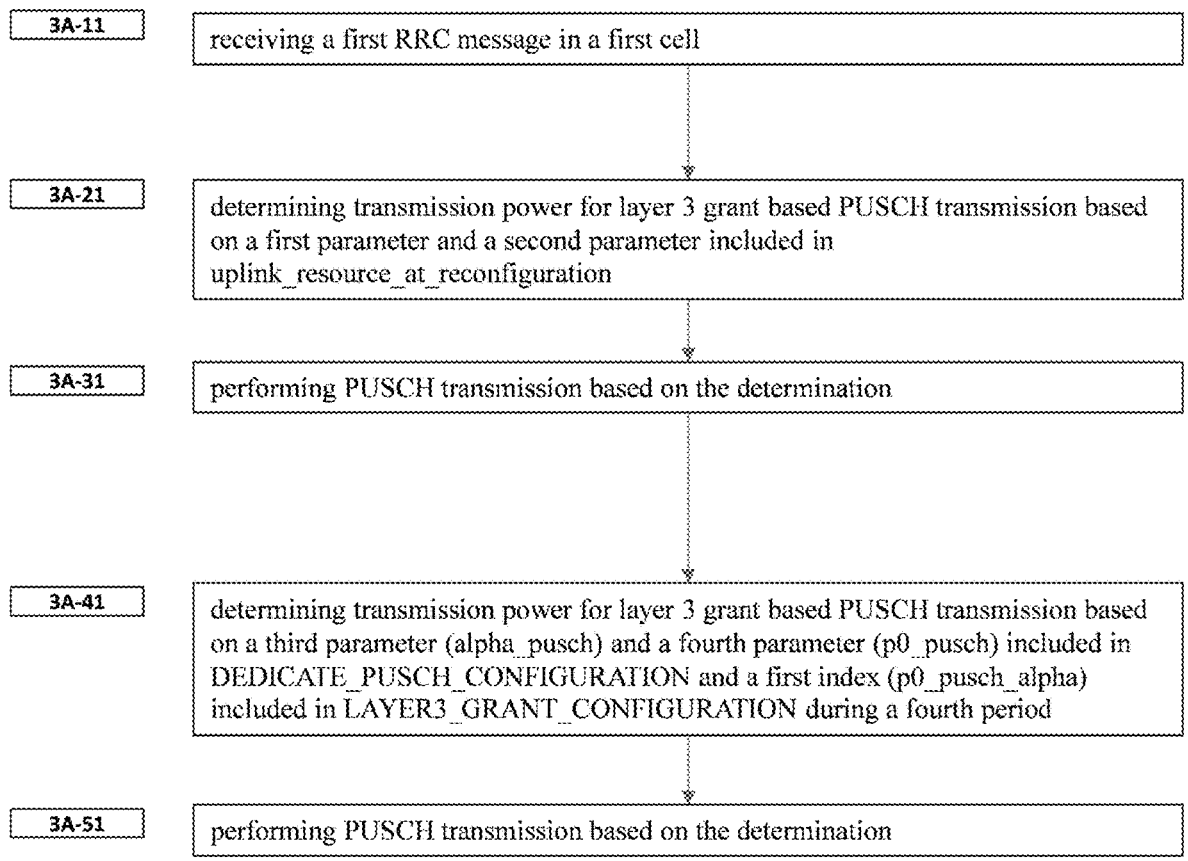
FIG. 3 is a flow diagram illustrating an operation of a terminal.

FIG. 3 illustrates the operation of the terminal.

At 3A-11, terminal receives a first RRC message in a first cell. The first RRC messages include information for uplink transmission power in the second cell.

At 3A-21, terminal determines transmission power for layer 3 grant based PUSCH transmission based on a first parameter and a second parameter included in uplink_resource_at_reconfiguration.

At 3A-31, terminal performs PUSCH transmission based on the determination.

At 3A-41 terminal determines transmission power for layer 3 grant based PUSCH transmission based on a third parameter (alpha_pusch) and a fourth parameter (p0_pusch) included in DEDICATE_PUSCH_CONFIGURATION and a first index (p0_pusch_alpha) included in LAYER3_GRANT_CONFIGURATION during a fourth period.

At 3A-51, terminal performs PUSCH transmission based on the determination.

Figure 4A:
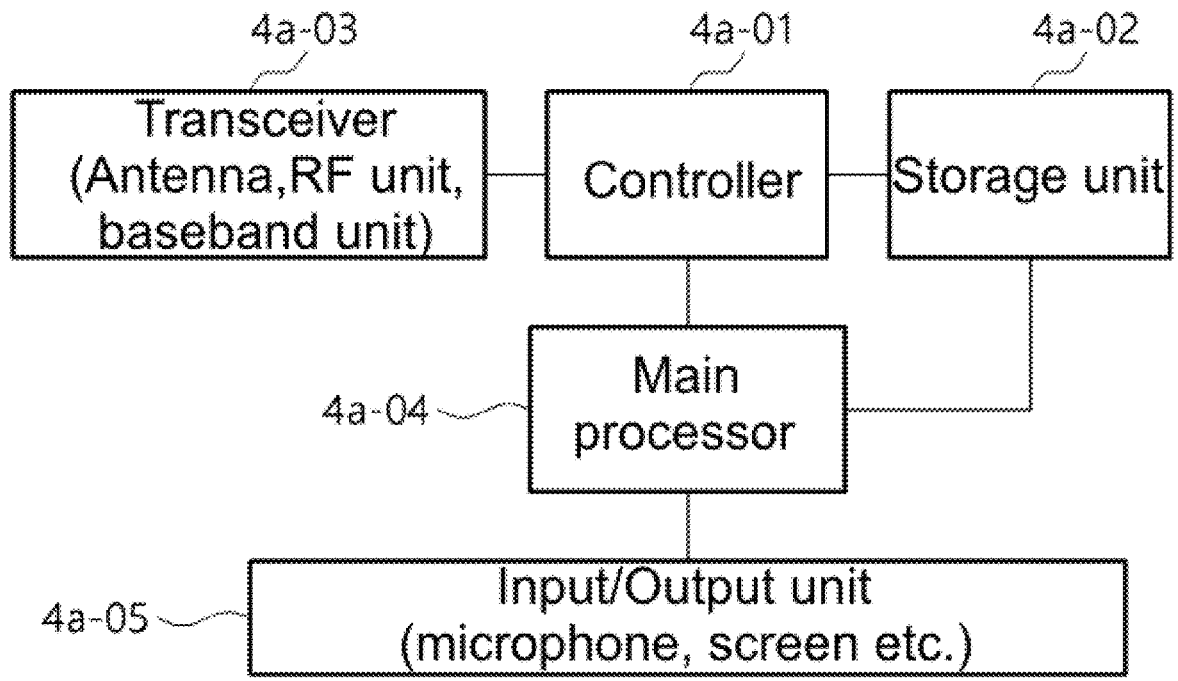
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A, FIG. 2B, FIG. 2C, FIG. 2D and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
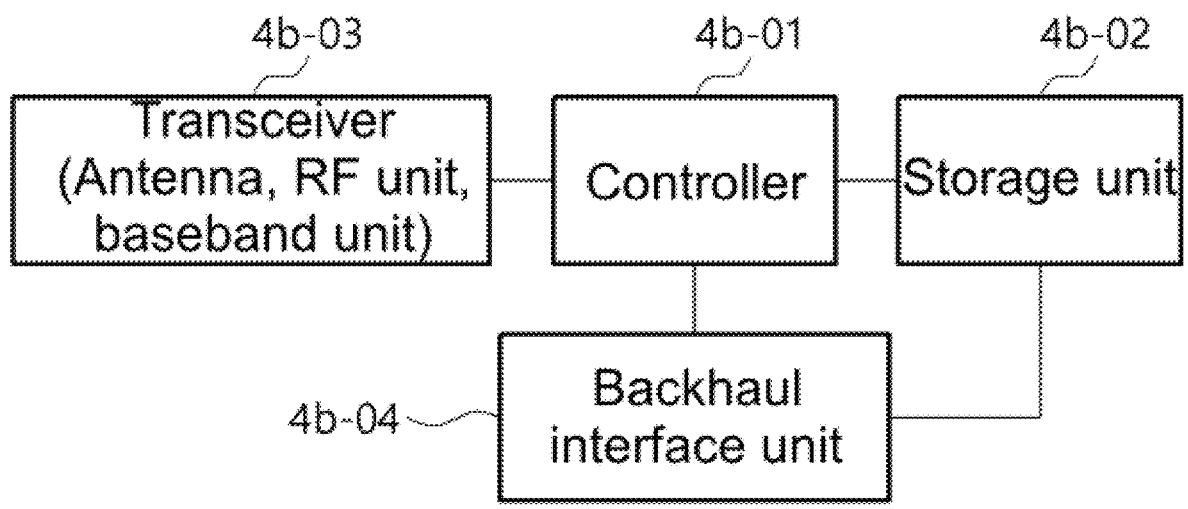
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A, FIG. 2B, FIG. 2C and FIG. 2D are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present invention.

TABLE 1

| Acronym | Full name | Acronym | Full name |
| --- | --- | --- | --- |
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
|  |  | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part |  |  |
| CA | Carrier Aggregation | RNTI | Radio Network Temporary Identifier |
| CAG | Closed Access Group |  |  |
| CG | Cell Group | RRC | Radio Resource Control |
| C-RNTI | Cell RNTI | RRM | Radio Resource Management |
| CSI | Channel State Information | RSRP | Reference Signal Received Power |
| DCI | Downlink Control Information | RSRQ | Reference Signal Received Quality |
| DRB | (user) Data Radio Bearer |  |  |
| DTX | Discontinuous Reception | RSSI | Received Signal Strength Indicator |
| HARQ | Hybrid Automatic Repeat Request | SCell | Secondary Cell |
| IE | Information element | SCS | Subcarrier Spacing |
| LCG | Logical Channel Group | SDAP | Service Data Adaptation Protocol |
| MAC | Medium Access Control |  |  |
| MIB | Master Information Block | SDU | Service Data Unit |
| NAS | Non-Access Stratum | SFN | System Frame Number |
| NG-RAN | NG Radio Access Network | S-GW | Serving Gateway |
| NR | NR Radio Access | SI | System Information |
| PBR | Prioritised Bit Rate | SIB | System Information Block |
| PCell | Primary Cell | SpCell | Special Cell |
| PCI | Physical Cell Identifier | SRB | Signalling Radio Bearer |
| PDCCH | Physical Downlink Control Channel | SRS | Sounding Reference Signal |
|  |  | SS | Search Space |
| PDCP | Packet Data Convergence Protocol | SSB | SS/PBCH block |
|  |  | SSS | Secondary Synchronisation Signal |
| PDSCH | Physical Downlink Shared Channel |  |  |
|  |  | SUL | Supplementary Uplink |
| PDU | Protocol Data Unit | TM | Transparent Mode |
| PHR | Power Headroom Report | UCI | Uplink Control Information |
| PLMN | Public Land Mobile Network | UE | User Equipment |
| PRACH | Physical Random Access Channel | UM | Unacknowledged Mode |
|  |  | CRP | Cell Reselection Priority |
| PRB | Physical Resource Block | FPP | First positioning protocol |
| PSS | Primary Synchronisation Signal | SPP | Second positioning protocol |
|  |  | DL-PRS | Downlink-Positioning Reference Signal |
| PUCCH | Physical Uplink Control Channel |  |  |
|  |  | SL-PRS | Sidelink-Positioning Reference Signal |
| PUSCH | Physical Uplink Shared Channel |  |  |
| DL-AOD | Downlink Angle-of-Departure |  |  |
| GNSS | Global Navigation Satellite System |  |  |

What is claimed is:

1. A method by a terminal, the method comprising:
receiving by the terminal a Radio Resource Control (RRC) reconfiguration message, wherein the RRC reconfiguration message comprises configuration information for cell level mobility from a first cell to a second cell;
performing by the terminal a set of operations; and
performing by the terminal data transfer in the second cell after performing a specific operation of the set of operations,
wherein, in case that the RRC reconfiguration message comprises a specific set of parameters, the set of operations comprises:
starting a timer related to cell level mobility;
resetting Medium Access Control (MAC) entity;
adjusting uplink transmission timing based on a parameter related to target timing advance;
receiving a layer 1 (L1) grant based on a first identifier;
performing uplink transmission of a specific MAC Protocol Data Unit (PDU) based on the L1 grant;
receiving downlink assignment; and
stopping the timer related to cell level mobility,
wherein the specific operation of the set of operations is the operation of stopping the timer related to cell level mobility, and
wherein the specific set of parameters comprises the parameter related to target timing advance and a parameter related to uplink transmission resource.

2. The method of claim 1,
wherein, in case that the RRC reconfiguration message does not comprise the specific set of parameters, the set of operations comprises:
starting the timer related to cell level mobility;
resetting the MAC entity;
receiving a layer 2 (L2) grant based on a second identifier;
adjusting uplink transmission timing based on timing advance command;
performing uplink transmission of the specific MAC PDU based on the L2 grant;
receiving downlink assignment; and
stopping the timer related to cell level mobility.

3. The method of claim 2,
wherein uplink transmission timing is adjusted:
before reception of grant for the specific MAC PDU in case that the RRC reconfiguration message comprises the specific set of parameters; and
after reception of grant for the specific MAC PDU in case that the RRC reconfiguration message does not comprise the specific set of parameters.

4. The method of the claim 1,
wherein the terminal applies a set of downlink frequency related parameters and a set of uplink frequency related parameters:
after resetting the MAC entity; and
before applying the parameter related to target timing advance.

5. The method of claim 4,
wherein the set of downlink frequency related parameters and the set of uplink frequency related parameters are comprised in a set of cell configuration parameters of the second cell.

6. The method of claim 1,
wherein the terminal stops the timer related to cell level mobility in case that a second L1 grant is received after performing the uplink transmission of the specific MAC PDU.

7. The method of claim 1,
wherein the specific MAC PDU is MAC PDU that comprises a RRC reconfiguration complete message.

8. The method of claim 1,
wherein the terminal determines whether cell level mobility is successful based on the timer related to cell level mobility.

9. The method of claim 8,
wherein, upon expiry of the timer related to cell level mobility, the terminal:
considers cell level mobility is not successful; and
starts recovery procedure.

10. The method of claim 1,
wherein, in case that the RRC reconfiguration message comprises the parameter related to target timing advance and a set of parameters for a specific layer 3 (L3) grant, the set of operations comprises:
starting the timer related to cell level mobility;
resetting the MAC entity;
adjusting uplink transmission timing based on the parameter related to target timing advance;
performing uplink transmission of the specific MAC PDU based on the specific L3 grant;
receiving downlink assignment; and
stopping the timer related to cell level mobility.

11. The method of claim 10, wherein:
the specific L3 grant is used only for a specific message from a specific logical channel; and the specific logical is dedicated control channel.

12. The method of claim 11,
wherein the specific message is a RRC reconfiguration complete message.

13. A terminal in a wireless communication system, the terminal comprising:
a transceiver configured to transmit and receive a signal, and
a controller configured to control the transceiver to:
receive a Radio Resource Control (RRC) reconfiguration message, wherein the RRC reconfiguration message comprises configuration information for cell level mobility from a first cell to a second cell,
perform a set of operations, and
perform data transfer in the second cell after performing a specific operation of the set of operations,
wherein, in case that the RRC reconfiguration message comprises a specific set of parameters, the set of operations comprises:
starting a timer related to cell level mobility;
resetting Medium Access Control (MAC) entity;
adjusting uplink transmission timing based on a parameter related to target timing advance;
receiving a layer 1 (L1) grant based on a first identifier;
performing uplink transmission of a specific MAC Protocol Data Unit (PDU) based on the L1 grant;
receiving downlink assignment; and
stopping the timer related to cell level mobility,
wherein the specific operation of the set of operations is the operation of stopping the timer related to cell level mobility, and
wherein the specific set of parameters comprises the parameter related to target timing advance and a parameter related to uplink transmission resource.

* * * * *